(12) United States Patent
Hirao

(10) Patent No.: US 8,244,047 B2
(45) Date of Patent: Aug. 14, 2012

(54) IMAGE COMPRESSION UNIT, IMAGE DECOMPRESSION UNIT AND IMAGE PROCESSING SYSTEM

(75) Inventor: Koichiro Hirao, Shizuoka (JP)

(73) Assignee: NEC Access Technica, Ltd., Kakegawa-shi, Shizuoka (JP)

( * ) Notice: Subject to any disclaimer, the term of this patent is extended or adjusted under 35 U.S.C. 154(b) by 367 days.

(21) Appl. No.: 12/588,363

(22) Filed: Oct. 13, 2009

(65) Prior Publication Data

US 2010/0119165 A1    May 13, 2010

(30) Foreign Application Priority Data

Nov. 13, 2008   (JP) ................................ 2008-290948

(51) Int. Cl.
*G06K 9/36*   (2006.01)
*G06K 9/46*   (2006.01)
(52) U.S. Cl. ........................................ 382/233; 382/239
(58) Field of Classification Search .................. 382/168, 382/169, 173, 190, 233, 239, 251; 375/E7.129, 375/E7.198; 348/308, 416.1, 441; 345/440.1; 704/200.1; 700/94
See application file for complete search history.

(56) References Cited

U.S. PATENT DOCUMENTS

| | | | | |
|---|---|---|---|---|
| 5,512,953 | A * | 4/1996 | Nahumi | 348/441 |
| 6,772,111 | B2 * | 8/2004 | Araki | 704/200.1 |
| 7,095,439 | B2 * | 8/2006 | Hammadou | 348/308 |
| 7,139,426 | B2 * | 11/2006 | Ivers et al. | 382/169 |
| 2002/0168137 | A1 * | 11/2002 | Ono et al. | 385/24 |
| 2006/0209346 | A1 | 9/2006 | Nakahara | |
| 2006/0274332 | A1 | 12/2006 | Miyagi | |
| 2007/0196023 | A1 | 8/2007 | Hama et al. | |
| 2010/0119165 | A1 * | 5/2010 | Hirao | 382/233 |

FOREIGN PATENT DOCUMENTS

| | | |
|---|---|---|
| JP | 9-200532 A | 7/1997 |
| JP | 2002-84425 | 3/2002 |
| JP | 2004-236295 | 8/2004 |
| JP | 2005-311743 A | 11/2005 |
| JP | 2005-312013 A | 11/2005 |
| JP | 2006-262436 A | 9/2006 |
| JP | 2006-343831 | 12/2006 |
| JP | 2007-88968 | 4/2007 |

OTHER PUBLICATIONS

Japanese Office Action dated Oct. 19, 2010, with English translation.

\* cited by examiner

*Primary Examiner* — Amir Alavi
(74) *Attorney, Agent, or Firm* — McGinn IP Law Group, PLLC

(57) ABSTRACT

An image compression unit of the invention includes a preprocessing unit that performs preprocessing for converting a first bit string representing intensity of pixels of which image data is composed into a second bit string, a number of digits of which is smaller than a number of digits of the first bit string, based on a predetermined region included in the image data and a first attribute information for identifying an attribute of the predetermined region, with the preprocessing being associated with the predetermined region of the image data and a bit string conversion unit which converts the second bit string into a third bit string based on distribution of frequency of appearance of the intensity in the second bit string and the first attribute information such that, for the pixel having higher frequency of appearance, the number of bit planes on which data of the pixel appear is less.

20 Claims, 20 Drawing Sheets

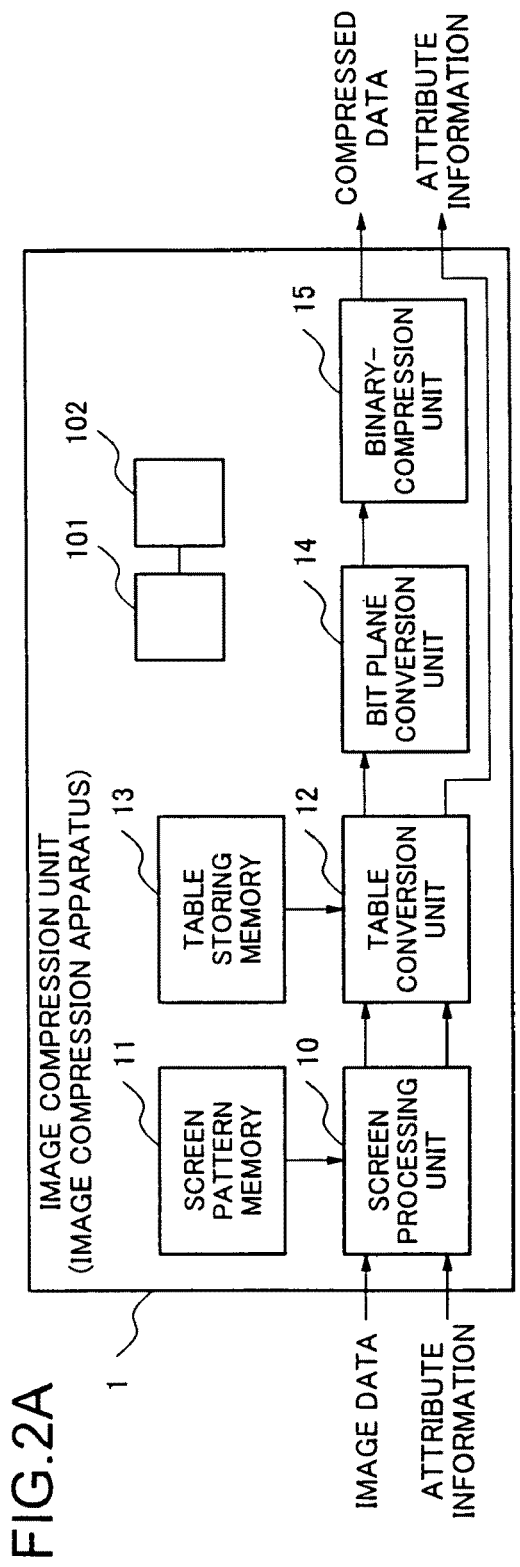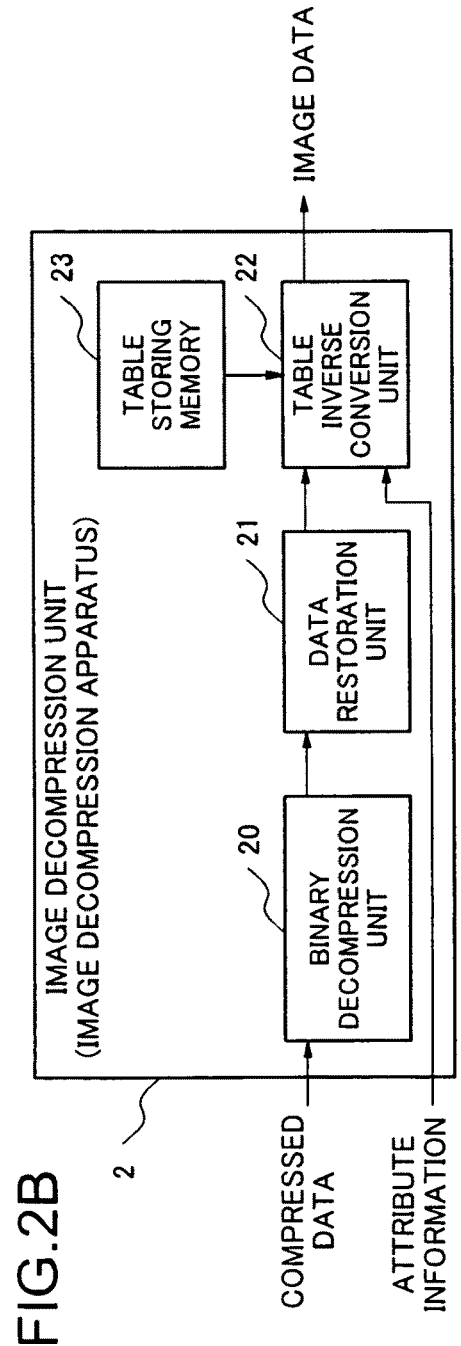

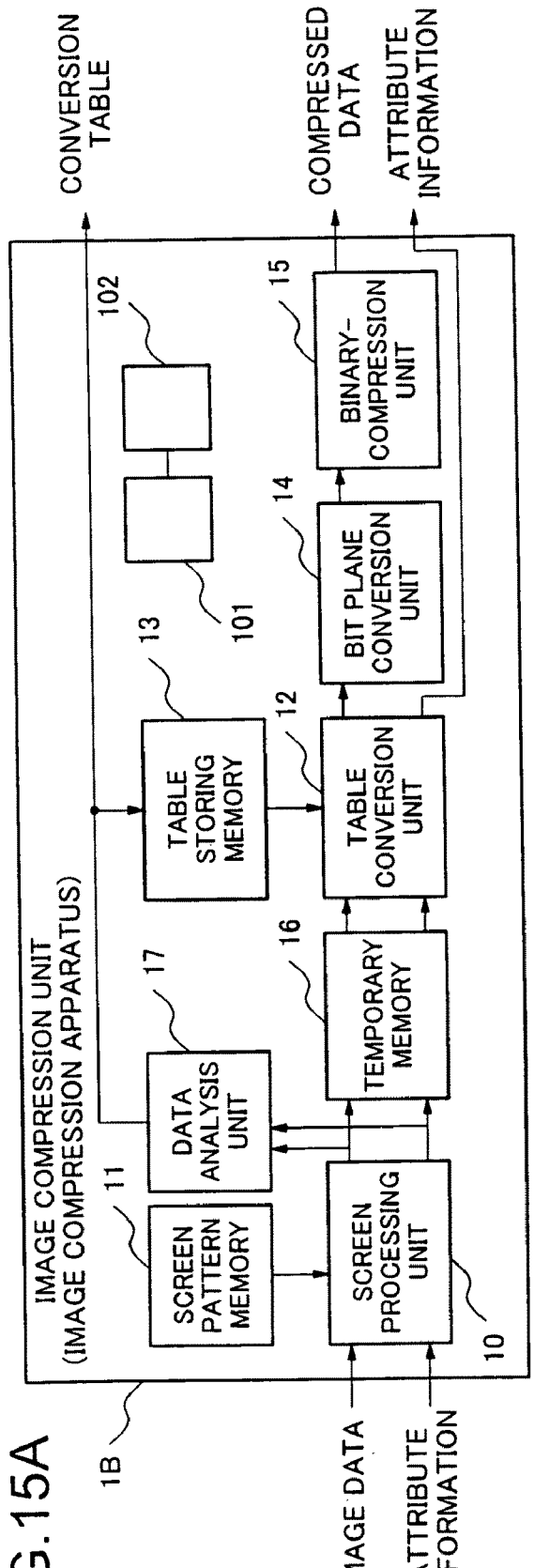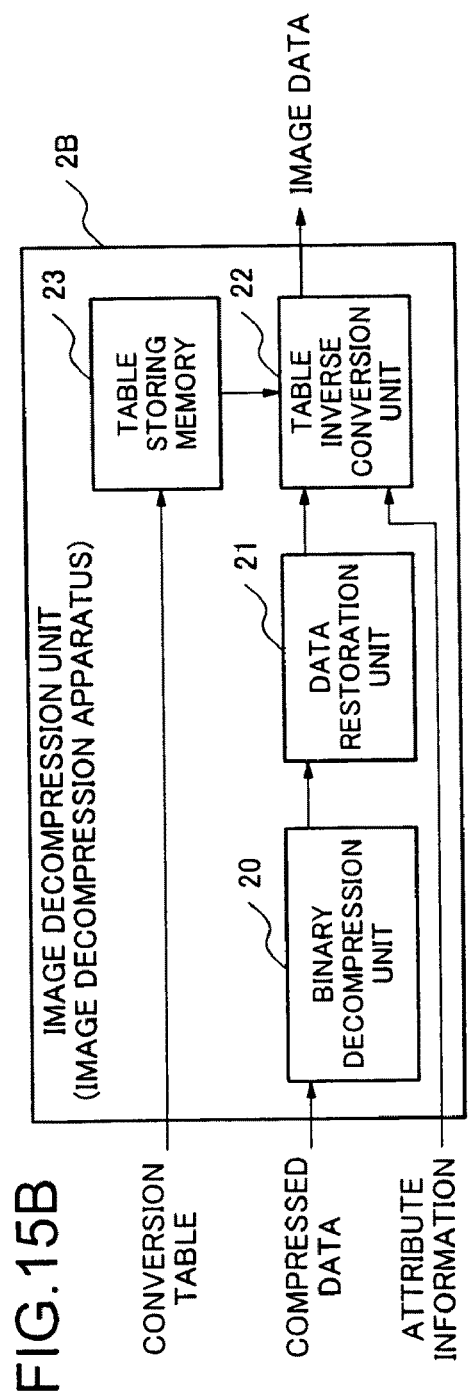
FIG.15A
FIG.15B

FIG.17

```
IMAGE COMPRESSION UNIT
(IMAGE COMPRESSION APPARATUS)

IMAGE DATA → ATTRIBUTE INFORMATION ACQUISITION UNIT (18) → SCREEN PROCESSING UNIT (10) → TABLE CONVERSION UNIT (12) → BIT PLANE CONVERSION UNIT (14) → BINARY-COMPRESSION UNIT (15) → COMPRESSED DATA
ATTRIBUTE INFORMATION →                                                                                                                                                        → ATTRIBUTE INFORMATION

SCREEN PATTERN MEMORY (11) → SCREEN PROCESSING UNIT
TABLE STORING MEMORY (13) → TABLE CONVERSION UNIT
ATTRIBUTE INFORMATION → SCREEN PROCESSING UNIT
```

IMAGE COMPRESSION UNIT, IMAGE DECOMPRESSION UNIT AND IMAGE PROCESSING SYSTEM

This application is based upon and claims the benefit of priority from Japanese patent application No. 2008-290948, filed on Nov. 13, 2008, the disclosure of which is incorporated herein in its entirety by reference.

TECHNICAL FIELD

The present invention relates to an image compression unit, an image decompression unit, an image processing system, an image compression method, an image decompression method, an image processing method, a program used for an image compression unit, and a program used for an image decompression unit.

BACKGROUND ART

The improvement of image processing technique enables an image processing system to output a high-quality image.

For example, printing equipment such as a printer, a copy machine, a facsimile machine, a MFP (Multi Function Peripheral) and the like is able to perform high-quality printing or photographic printing.

Image data composed of multi level pixels is inputted to such printing equipment. Then, the printing equipment performs printing or photographic printing on the basis of the image data.

In cases such as where a plurality of copies of inputted image data is needed to be printed, such printing equipment stores the image data in an internal memory temporarily. Then, the printing equipment reads the image data from the internal memory and performs printing operation.

Image data consumes the memory capacity of printing equipment largely when the data is left uncompressed. For this reason, printing equipment stores image data in a memory after the data is compressed by a predetermined method using an image coding system such as JPEG (Joint Photographic Experts Group) or the like. When image data is printed, the printing equipment reads compressed image data from the memory. After that, the printing equipment decompresses the compressed image data and performs printing processing using the decompressed image data.

In Japanese Patent Application Laid-Open No. 2002-084425, there is described a multi level image data compression device in which inputted multi level image data is binary-compressed without changing the form of the original image data when there are a little intermediate image intensity portions in the image data.

In Japanese Patent Application Laid-Open No. 2004-236295, a technology of an image processing apparatus which uses a bit plane coding technique which is one of the features of the compression coding by the JPEG2000 algorithm is described.

In Japanese Patent Application Laid-Open No. 2004-312773, there is described an image encoding apparatus which performs bit plane compression.

In Japanese Patent Application Laid-Open No. 2006-343831, an image processing apparatus which determines an attribute of an image for each block is described.

In Japanese Patent Application Laid-Open No. 2007-088968, there is described an image output system using attribute information.

SUMMARY

An exemplary object of the invention is to provide an image compression unit, an image decompression unit, an image processing system, an image compression method, an image decompression method, an image processing method, a program used for an image compression unit and a program used for an image decompression unit which are capable of improving the efficiency of bit plane processing.

An image compression unit, according to an exemplary aspect of the invention includes a preprocessing unit that performs preprocessing for converting a first bit string representing an intensity of each of a plurality of pixels of which image data is composed into a second bit string, a number of digits of which is smaller than a number of digits of the first bit string, based on a predetermined region included in the image data and a first attribute information for identifying an attribute of the predetermined region, with the preprocessing being associated with the predetermined region of the image data and includes a bit string conversion unit which converts the second bit string into a third bit string based on distribution of an frequency of appearance of the intensity in the second bit string and the first attribute information such that, for the pixel having a higher frequency of appearance of the intensity, a number of bit planes on which data of the pixel appear is less.

An image decompression unit, according to an exemplary aspect of the invention includes a bit string inverse conversion unit which obtains a fourth bit string and a second attribute information corresponding to the fourth bit string, identifies a region to which the fourth bit string corresponds based on the second attribute information, and converts, for the region identified, the fourth bit string into a fifth bit string representing intensity of a pixel on a region-by-region basis.

An image compression method, according to an exemplary aspect of the invention includes the steps of performing preprocessing for converting a first bit string representing intensity of each of a plurality of pixels of which image data is composed into a second bit string, a number of digits of which is smaller than a number of digits of the first bit string, based on a predetermined region included in the image data and on a first attribute information for identifying an attribute of the predetermined region, with the preprocessing being associated with the predetermined region of the image data; and converting the second bit string into a third bit string based on distribution of an frequency of appearance of the intensity in the second bit string and the first attribute information such that, for the pixel having a higher frequency of appearance of the intensity, a number of bit planes on which data of the pixel appear is less.

An image decompression method, according to an exemplary aspect of the invention includes the steps of acquiring a fourth bit string and a second attribute information corresponding to the fourth bit string; identifying a region to which the fourth bit string corresponds based on the second attribute information; and for the region identified, converting the fourth bit string into a fifth bit string representing intensity of a pixel on a region-by-region basis.

An image compression unit, according to an exemplary aspect of the invention includes a preprocessing means for performing preprocessing for converting a first bit string representing intensity of each of a plurality of pixels of which image data is composed into a second bit string, a number of digits of which is smaller than a number of digits of the first bit string, based on a predetermined region included in the image data and a first attribute information for identifying an attribute of the predetermined region, with the preprocessing being associated with the predetermined region of the image data; and a bit string conversion means for converting the second bit string into a third bit string based on distribution of an frequency of appearance of the intensity in the second bit string and the first attribute information such that, for the pixel having a higher frequency of appearance of the intensity, a number of bit planes on which data of the pixel appear is less.

An image decompression unit, according to an exemplary aspect of the invention includes a bit string inverse conversion means for obtaining a fourth bit string and a second attribute information corresponding to the fourth bit string, for identifying a region to which the fourth bit string corresponds based on the second attribute information, and for converting, for the region identified, the fourth bit string into a fifth bit string representing intensity of a pixel on a region-by-region basis.

BRIEF DESCRIPTION OF THE DRAWINGS

Exemplary features and advantages of the present invention will become apparent from the following detailed description when taken with the accompanying drawings in which:

FIG. 2A is a diagram showing an image compression unit in the first exemplary embodiment of the present invention;

FIG. 2B is a diagram showing an image decompression unit in the first exemplary embodiment of the present invention;

FIG. 15A is a diagram showing an image compression unit according to the second exemplary embodiment of the present invention;

FIG. 15B is a diagram showing an image decompression unit according to the second exemplary embodiment of the present invention;

FIG. 17 is a diagram showing an image compression unit in the third exemplary embodiment of the present invention;

EXEMPLARY EMBODIMENT

Next, a detailed explanation will be given for exemplary embodiments with reference to the drawings.

1. First Exemplary Embodiment

The first exemplary embodiment of the present invention will be described with reference to FIG. 1A and FIG. 2A.

Figure 1A:
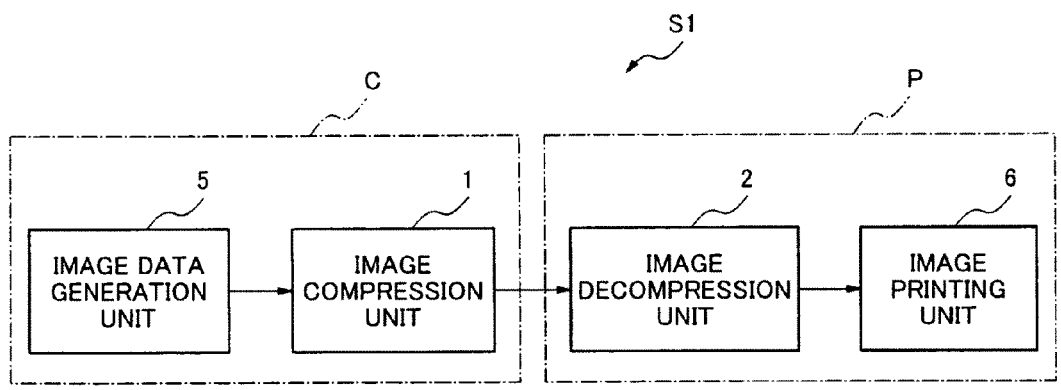
FIG. 1A is a diagram showing the configuration of an image processing system which is a first exemplary embodiment of the present invention.

FIG. 1A is a diagram showing a configuration of an image processing system S1 which is the first exemplary embodiment of the present invention.

The image processing system of the first exemplary embodiment is an image output system which outputs an image. The image processing system shown in FIG. 1A includes a computer C and an image output unit P connected to the computer.

The computer C is provided with an image data generation unit 5 and an image compression unit 1. The image data generation unit 5 generates image data on the basis of program data described by a predetermined page description language. For example, the page description language includes PCL (Printer Control Language) and PS (PostScript). The image compression unit 1 compresses image data.

The image data generation unit 5 generates attribute information mentioned later. Here, the image data generation unit 5 may generate image data and attribute information based on data inputted from outside of the computer C. Alternatively, the image data generation unit 5 may generate image data and attribute information based on data inside the image data generation unit 5. Then, the image data generation unit 5 inputs generated image data and attribute information to the image compression unit 1.

Here, the image data is monochrome or colored multi level image data in which the color of each pixel is expressed in a predetermined bit string. Such data is color space data for print. When image data is of monochrome, the image data is data representing the intensity of a pixel. When image data is of color, the image data is color space data. It is desirable that color space data is data of CMYK (Cyan, Magenta, Yellow, Key) color space. However, other color spaces may be used. One piece of image data may include one page of image data. Or, one piece of image data may include image data of a plurality of pages.

Meanwhile, hereinafter, a case in which one piece of image data includes single page of image data will be described.

Figure 3:
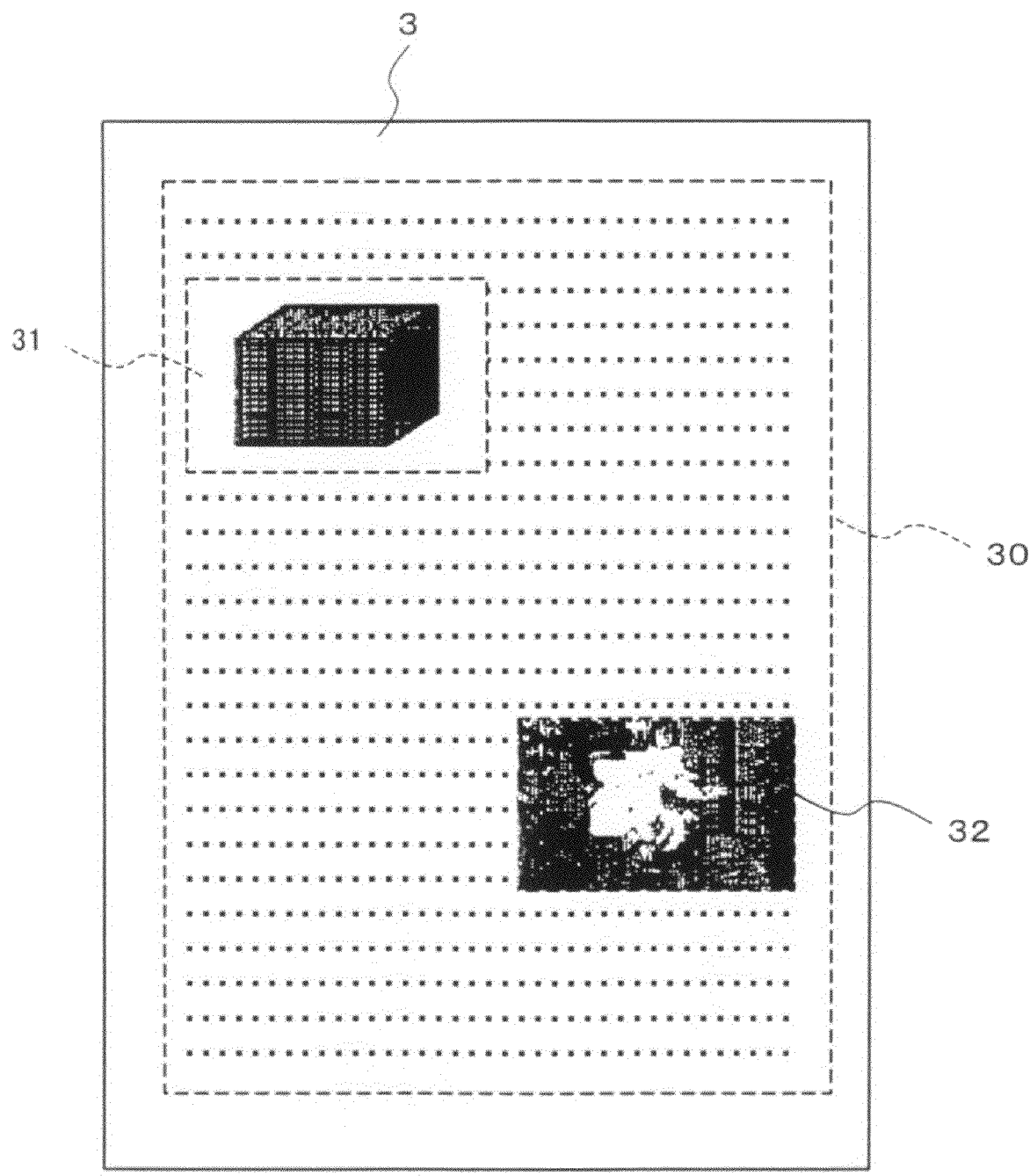
FIG. 3 is a diagram showing image data which is processed in the image processing system of the first exemplary embodiment of the present invention.

FIG. 3 is a diagram showing an example of image data processed in an image processing system according to the first exemplary embodiment of the present invention. The image data generation unit 5 generates image data 3 including a character region 30, a graphic region 31 and a photograph region 32 on the basis of document data created by a means for generating a document of the rich text type (not illustrated) installed in the computer C, for example. However, the image data generation unit 5 may generate the image data 3 on the basis of data inputted from outside of the image data generation unit 5.

Meanwhile, in the first exemplary embodiment, the image data 3 that the image data generation unit 5 generates is monochrome image data in which the intensity is expressed in 256 levels of intensity (8 bits). The pixel data of the image data indicates the intensity of black color.

FIG. 2A is a functional block diagram showing the image compression unit 1. The image compression unit 1 is provided with a screen processing unit 10, a screen pattern memory 11, a table conversion unit 12, a table storing memory 13, a bit plane conversion unit 14 and a binary-compression unit 15.

The image compression unit 1 also includes a central processing unit 101 and a program memory 102.

The screen processing unit 10 is a preprocessing unit which performs preprocessing in advance of processing of the table conversion unit 12. The screen pattern memory 11 is connected to the screen processing unit 10. The screen processing unit 10 performs screen processing using a screen pattern stored in the screen pattern memory 11. A screen pattern may be written in the screen pattern memory fixedly or may be rewritable from outside the image compression unit 1.

The screen processing unit 10 reduces a bit string which indicates the intensity of each pixel of the image data to the predetermined number of bits.

The screen processing unit 10 acquires attribute information which specifies information on a given region included in image data and the attribute of the given region. In the first exemplary embodiment, the image data generation unit 5 creates attribute information at the moment when the image data 3 is generated. In the first exemplary embodiment, an attribute of image data is of one of the following three kinds, "character", "graphic" and "photograph". However, attributes other than these may be defined. Attribute information includes an attribute and information on a region corresponding to the attribute. The information on a region may be data of coordinate values of two corner points on a diagonal line of a rectangular region, for example.

Attribute information is inputted to the image compression unit 1 with image data.

The screen pattern memory 11 stores a plurality of kinds of screen patterns.

The screen processing unit 10 performs screen processing for each region of the inputted image data 3. Specifically, the screen processing unit 10 performs screen processing for respective regions such as the character region 30, the graphic region 31 and the photograph region 32 changing a screen pattern on the basis of inputted attribute information.

Figure 7:
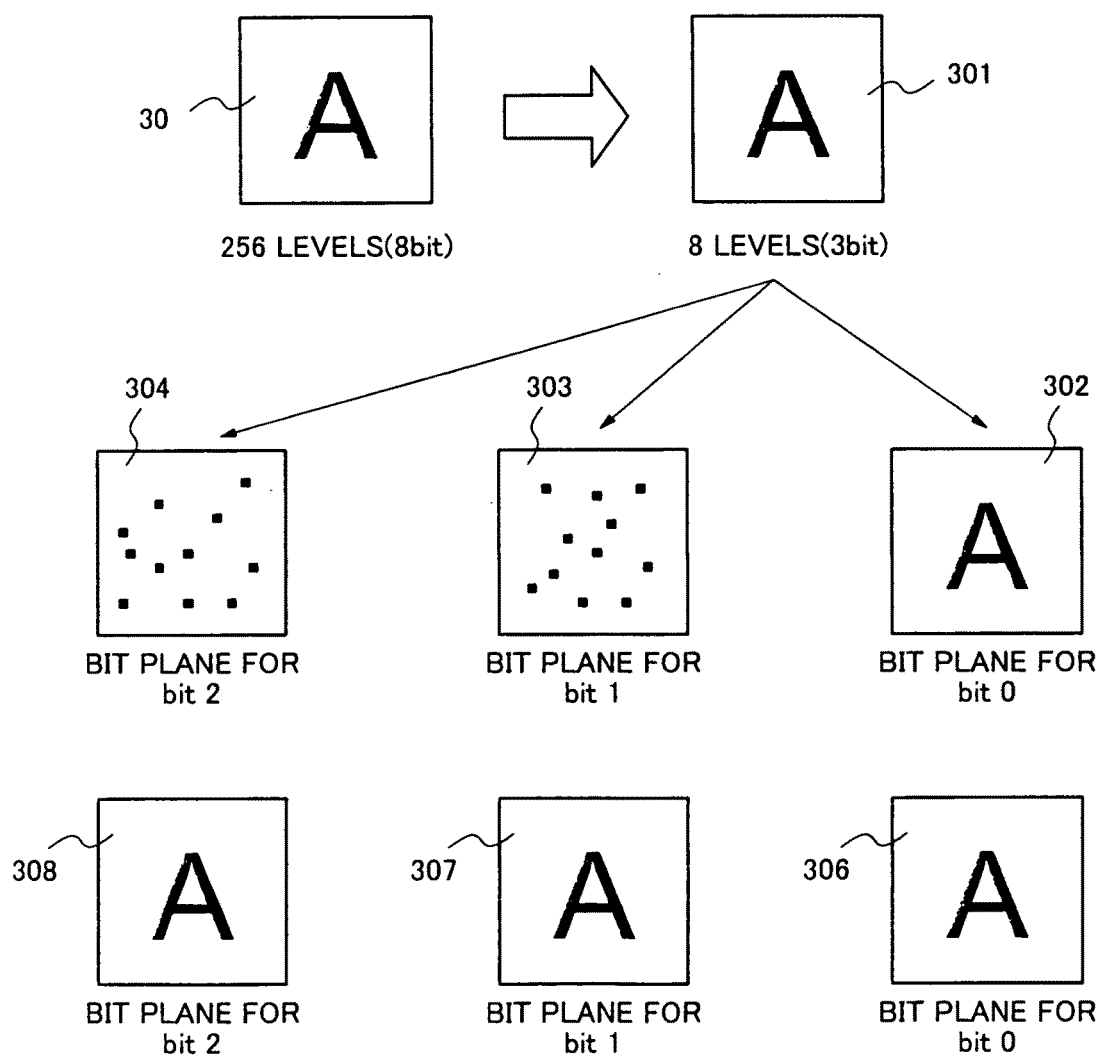
FIG. 7 is a diagram showing conversion processing of a character region by a bit plane conversion unit according to the first exemplary embodiment of the present invention.
Figure 10:
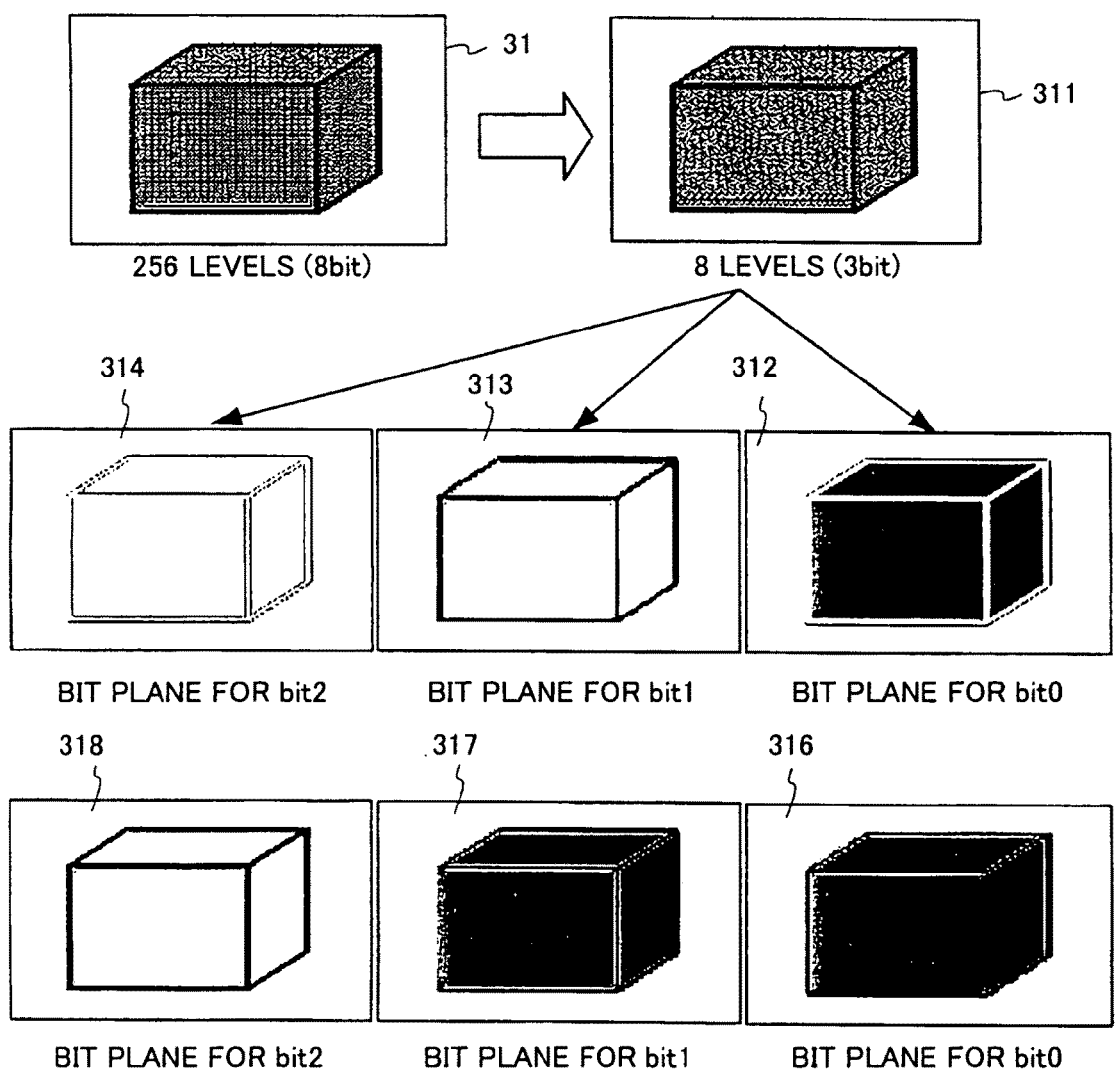
FIG. 10 is a diagram showing conversion processing of a graphic region by the bit plane conversion unit according to the first exemplary embodiment of the present invention.
Figure 13:
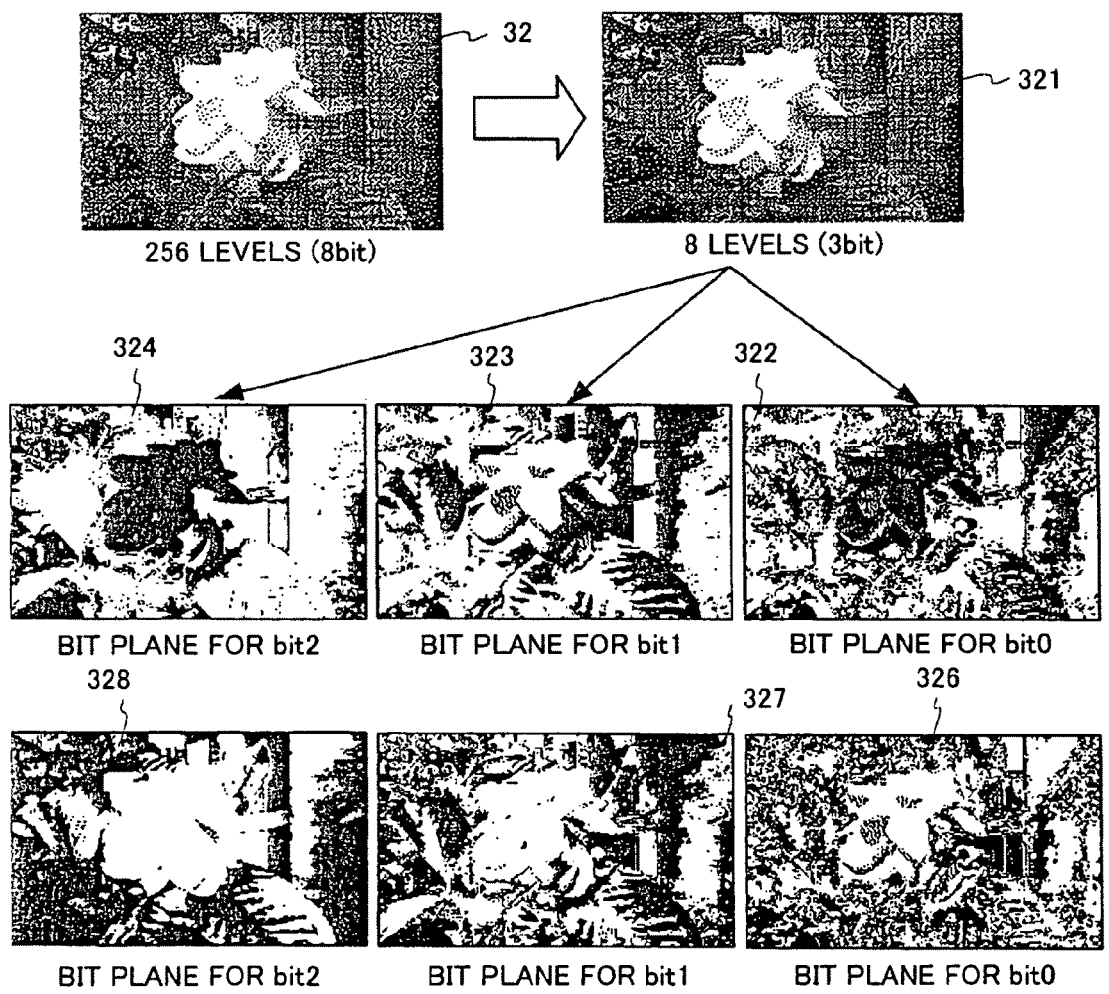
FIG. 13 is a diagram showing conversion processing of a photograph region by the bit plane conversion unit according to the first exemplary embodiment of the present invention.

Further, operation of the screen processing unit 10 will be described using FIG. 7, FIG. 10 and FIG. 13. FIG. 7 is a diagram showing conversion processing for a character region by the bit plane conversion unit according to the first exemplary embodiment. FIG. 10 is a diagram showing conversion processing of a bit plane conversion unit for a graphic region according to the first exemplary embodiment. FIG. 13 is a diagram showing conversion processing of a bit plane conversion unit for a photograph region according to the first exemplary embodiment.

The screen processing unit 10 converts monochrome image data 30 of 256 levels of intensity (8 bits) into monochrome image data 301 of eight levels of intensity (3 bits). Similarly, the screen processing unit 10 converts gray image data 31 and 32 shown in FIG. 3 into gray image data 311 and 321 shown in FIGS. 10 and 13, respectively. Here, in a bit string representing the intensity of each pixel of the image data 3 after screen processing, the least significant bit is defined as bit 0, and the most significant bit is defined as bit 2.

Generally known screen processing technologies for reducing the number of constituent bits for each pixel can be used for the screen processing unit 10.

Figure 4:
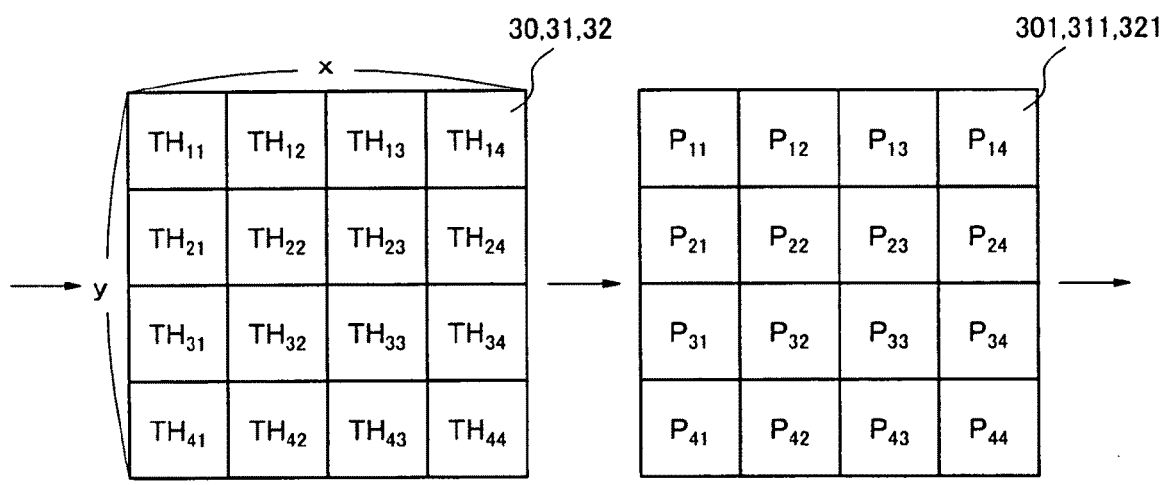
FIG. 4 is a diagram showing processing of a screen processing unit in the first exemplary embodiment of the present invention.

FIG. 4 is a diagram showing screen processing of the screen processing unit 10 according to the first exemplary embodiment.

The character region 30, graphic region 31 and photograph region 32 which are included in the image data 3 shown in FIG. 3 are converted into multi level data of eight levels of intensity (3 bits) on a pixel-by-pixel basis using a screen pattern. A screen pattern is a pattern with an x-direction (main scanning direction) length and a y-direction (vertical scanning direction) length, each of the lengths corresponding to the length of a plurality of pixels. Threshold values TH 11, TH 12 . . . and TH 44 which are used for multi level conversion of eight stages are set to each pixel of the screen pattern. Screen processing using a screen pattern is known as the dither pattern technology of multi level processing, for example.

Image data after screen processing is different from image data before the screen processing and is not data which indicates the intensity directly. For example, in the multi level dither pattern processing, the intensity of a 4×4 pixels frame area of 256 levels of intensity as a whole in a range of which a screen pattern is composed is approximated by a set of 4×4 pixels of eight levels of intensity in the identical range.

Figure 5A:
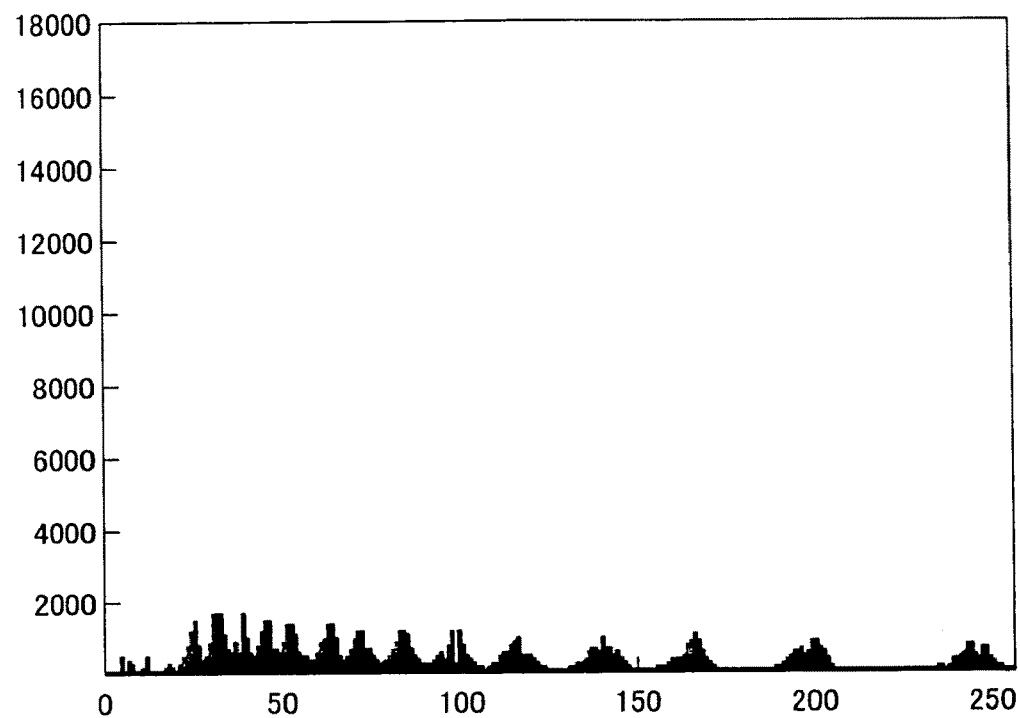
FIG. 5A is a diagram showing a gradation histogram of a character region of processed image data before the screen processing according to the first exemplary embodiment of the present invention.
Figure 5B:
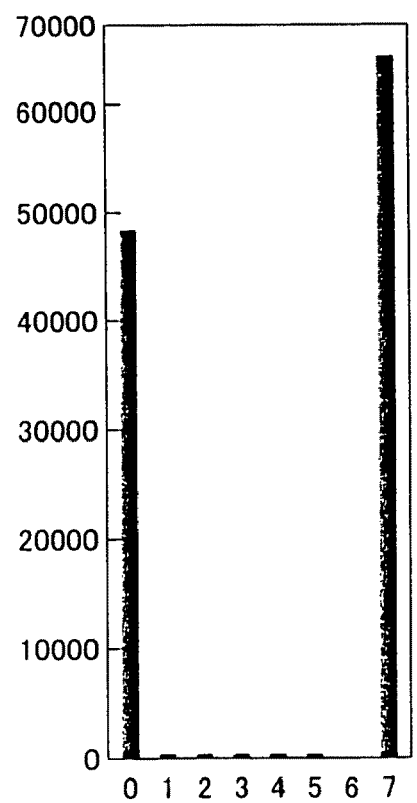
FIG. 5B is a diagram showing a gradation histogram of a character region of processed image data after the screen processing according to the first exemplary embodiment of the present invention.
Figure 8A:
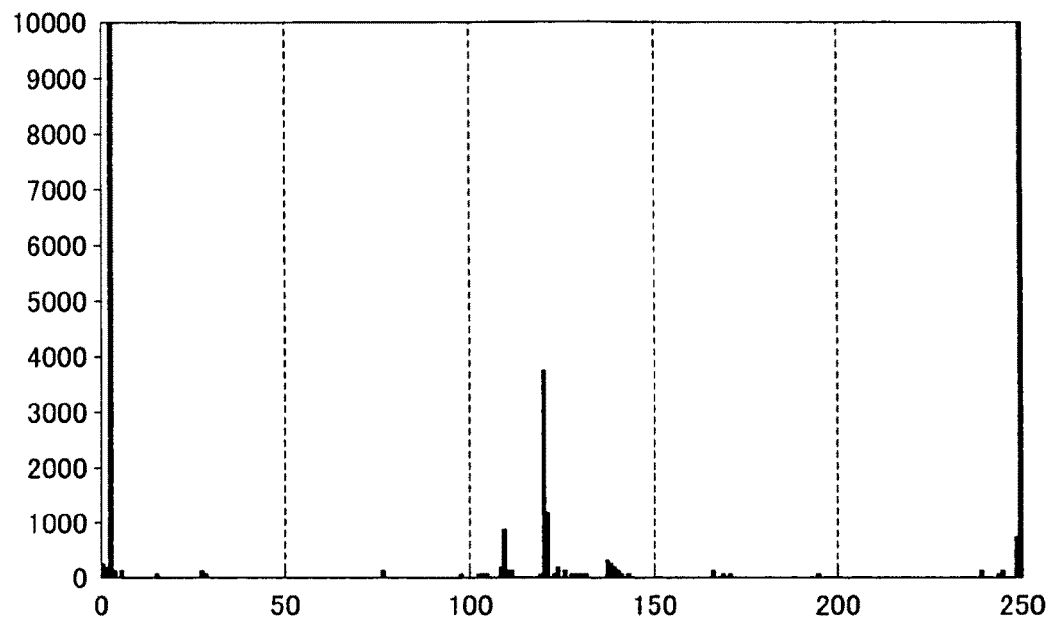
FIG. 8A is a diagram showing a gradation histogram of a graphic region of processed image data before the screen processing according to the first exemplary embodiment of the present invention.
Figure 8B:
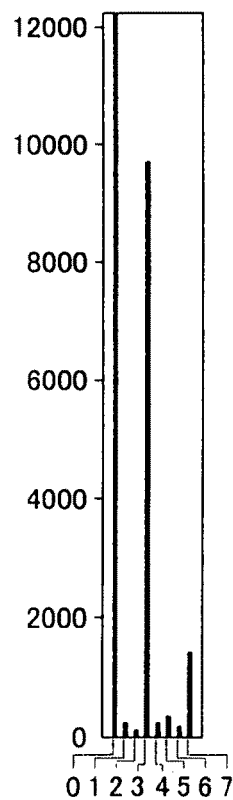
FIG. 8B is a diagram showing a gradation histogram of a graphic region of processed image data after the screen processing according to the first exemplary embodiment of the present invention.
Figure 11A:
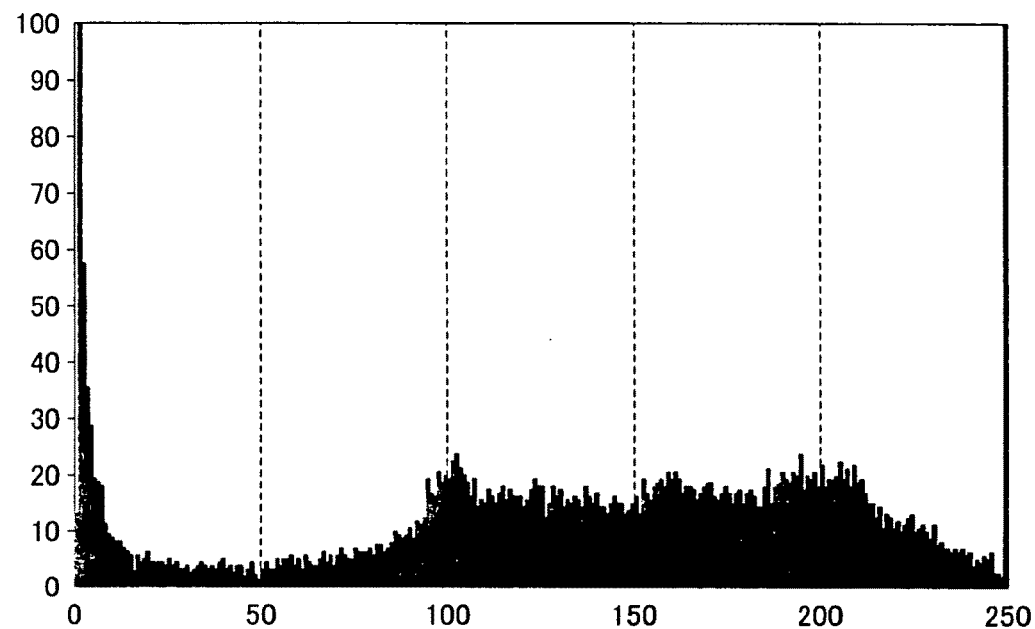
FIG. 11A is a diagram showing a gradation histogram of a photograph region of processed image data before the screen processing according to the first exemplary embodiment of the present invention.
Figure 11B:
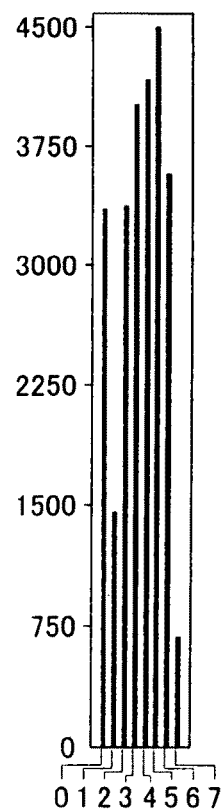
FIG. 11B is a diagram which indicates a gradation histogram of a photograph region of processed image data after screen processing according to the first exemplary embodiment of the present invention.

By doing above, as shown in FIG. 5B, FIG. 8B and FIG. 11B, in each region (301 in FIG. 7, 311 in FIGS. 10 and 321 in FIG. 13) included in image data after screen processing, the frequency of appearance of intensity of a pixel unevenly distributes in a gradation histogram.

FIG. 5A is a diagram showing a gradation histogram of a character region of processed image data before screen processing in the first exemplary embodiment.

FIG. 5B is a diagram showing a gradation histogram of a character region of processed image data after screen processing according to the first exemplary embodiment.

FIG. 8A is a diagram showing a gradation histogram of a graphic region of processed image data before screen processing in the first exemplary embodiment.

FIG. 8B is a diagram showing a gradation histogram of a graphic region of processed image data after screen processing according to the first exemplary embodiment.

FIG. 11A is a diagram showing a gradation histogram of a photographic region of processed image data before screen processing according to the first exemplary embodiment.

FIG. 11B is a diagram showing a gradation histogram of a photographic region of processed image data after screen processing according to the first exemplary embodiment.

In FIG. 5A, FIG. 8A and FIG. 11A, the horizontal axes is shown having 256 levels of intensity from 0 to 255, and the larger a numerical value is, the higher the intensity of a pixel is. The vertical axis indicates the frequency of pixels with that intensity.

In FIG. 5B, FIG. 8B and FIG. 11B, it shows that the horizontal axes is of eight levels of intensity from 0 to 7, and the larger the numerical value of intensity is, the higher the intensity of a pixel is. Vertical axis indicates the frequency of pixels having that intensity.

In the histogram of a character region shown in FIG. 5B, the intensity of most pixels is concentrated in the intensity 0 and the intensity 7. In contrast, pixels of the intensity other than the intensity 0 and the intensity 7 appear with the frequency of only about 0.5 percent of that of pixels of the intensity 7 which has the largest frequency.

Similarly, in the histogram of a graphic region shown in FIG. 8B, most pixels are concentrated in the intensity 0 and the intensity 3.

Further, in the histogram of a photograph region shown in FIG. 11B, frequency of pixels between the intensity 4 to 7 are relatively large.

Thus, the distribution of intensity for each region is different.

Operation of the table conversion unit 12 will be described with reference to FIG. 2A and FIG. 6.

The table conversion unit 12 shown in FIG. 2A converts a bit string of image data. The table conversion unit 12 performs a conversion processing for each pixel of image data to which screen processing has been performed by the screen processing unit 10 on the basis of conversion tables 130-132.

The conversion tables 130-132 are stored in the table storing memory 13. The table storing memory 13 is composed of a storage device such as a semiconductor memory. In the conversion tables 130-132, a bit string corresponding to the intensity of a pixel is correlated to a predetermined bit string according to the frequency of appearance.

The table conversion unit 12 selects one of the predetermined conversion tables 130-132 stored in the table storing memory 13 on the basis of attribute information on image data. Then, the table conversion unit 12 performs a conversion processing of image data 3 using the selected tables. The conversion performed at the table conversion unit 12 is hereinafter called "table conversion".

Figure 6:
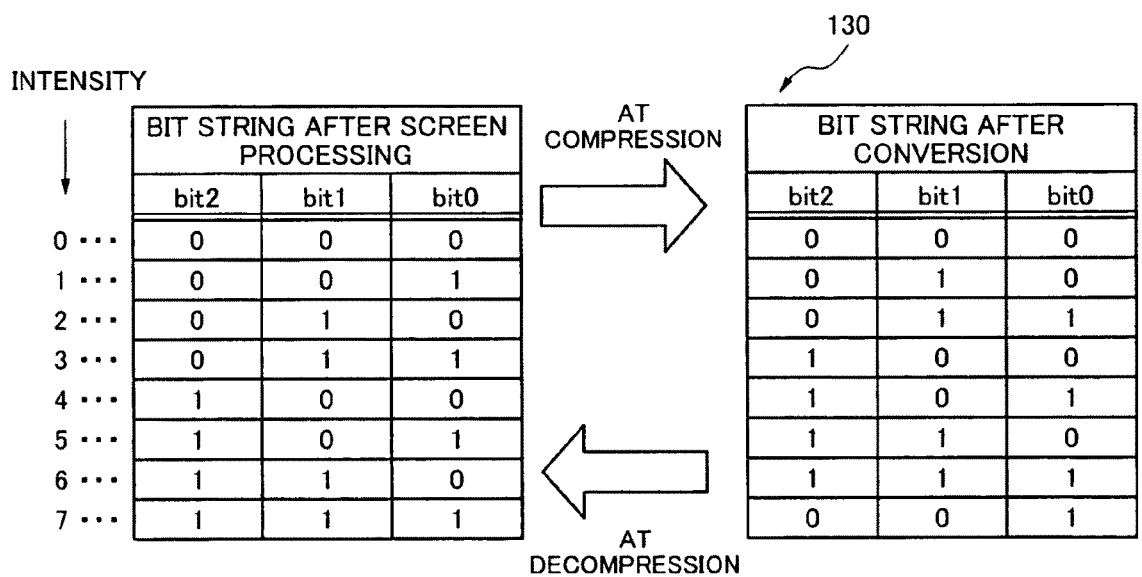
FIG. 6 is a diagram showing a conversion table which is applied to a character region of processed image data according to the first exemplary embodiment of the present invention.
Figure 9:
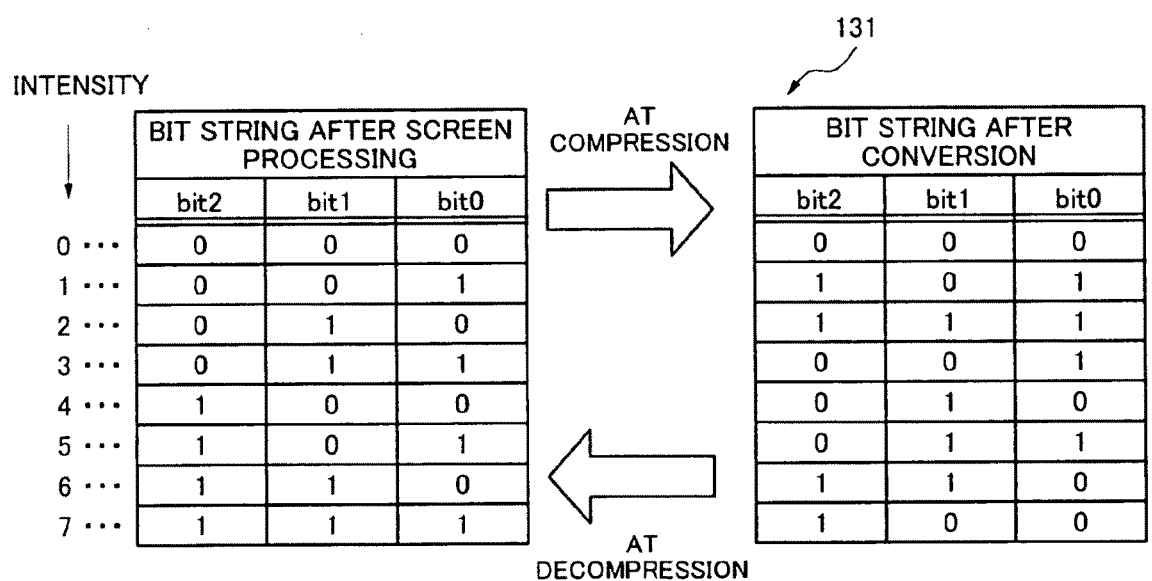
FIG. 9 is a diagram showing a conversion table which is applied to a graphic region of processed image data according to the first exemplary embodiment of the present invention.
Figure 12:
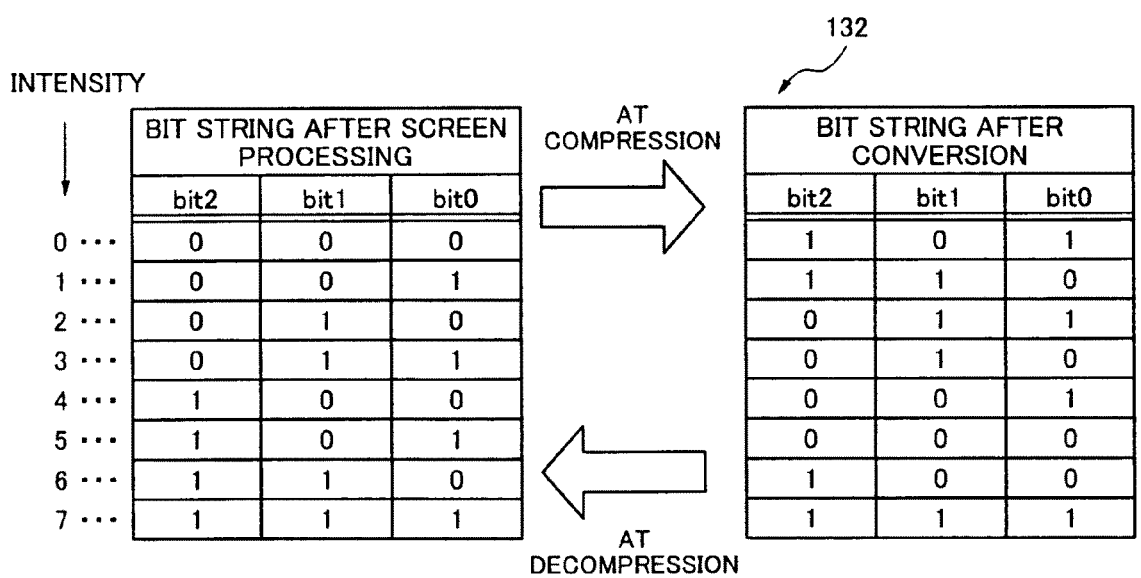
FIG. 12 is a diagram showing a conversion table which is applied to a photograph region of processed image data according to the first exemplary embodiment of the present invention.

The table storing memory 13 of the first exemplary embodiment stores the conversion table 130 for character regions shown in FIG. 6, the conversion table 131 for graphic regions shown in FIG. 9 and the conversion table 132 for photograph regions shown in FIG. 12. These conversion tables 130-132 are created in advance for each attribute of image data on the basis of the frequency of appearance of the intensity.

Here, regarding the conversion tables 130-132, a relation between the frequency of appearance of the intensity and a conversion table will be described.

FIG. 6 indicates the conversion table 130 for character regions.

As shown in FIG. 5B, a character region 301 has a high frequency of appearance at the intensity 0 and the intensity 7. For this reason, the conversion table 130 for character regions is described such that the intensity 0 ("000") and intensity 7 ("111") are converted to "000" and "001", respectively. Also, the conversion table 130 is described such that the intensity 1 ("001"), the intensity 2 ("010"), the intensity 3 ("011"), the intensity 4 ("100"), the intensity 5 ("101") and the intensity 6 ("110") are converted to "010", "011", "100", "101", "110" and "111", respectively.

FIG. 9 indicates the conversion table 131 applied to graphic regions.

As shown in FIG. 8B, the densities of pixels of a graphic region 311 has a high frequency of appearance at the intensity 0 and the intensity 3. For this reason, the conversion table 131 for graphic regions is described such that the intensity 0 ("000") and the intensity 3 ("011") are converted to "000" and "001", respectively. Also, the conversion table 131 is described such that the intensity 1 ("001"), the intensity 2 ("010"), the intensity 4 ("100"), the intensity 5 ("101"), the intensity 6 ("110") and the intensity 7 ("111") are converted to "101", "111", "010", "011", "110" and "100", respectively.

FIG. 12 indicates the conversion table 132 for photograph regions.

As shown in FIG. 11B, a photograph region 321 has a high frequency of appearance at the intensity 3-6. For this reason, the conversion table 132 for photograph regions is described such that the intensity 3 ("011"), the intensity 4 ("100"), the intensity 5 ("101"), the intensity 6 ("110") are converted to "010", "001", "000" and "100", respectively. Also, the conversion table 132 is described such that the intensity 0 ("000") are converted to "101", the intensity 1 ("001") to "110", the intensity 2 ("010") to "011" and the intensity 7 ("111") to "111".

Meanwhile, any of the conversion rules described in the conversion tables 130-132 mentioned above is only one instance among many. The conversion rules can be changed according to image data.

The table conversion unit 12 selects one of the conversion tables for each region of image data based on attribute information. The table conversion unit 12 performs table conversion for the character region 30, the graphic region 31 and the photograph region 32 using these conversion tables. Because the table conversion processing is an easy processing, the circuit size of a table conversion unit 12 can be made small. Also, even when the function of the table conversion unit is realized by a program, high processing performance is not required for execution of the program.

The bit plane conversion unit 14 converts the image data 3 to which table conversion has been performed into a bit plane. A bit plane is generated for each digit of a bit string. The bit plane conversion unit 14 may integrate these bit planes into one bit plane. Or, the bit plane conversion unit 14 may deal with a plurality of bit planes as a plurality of pieces of data. The bit plane conversion unit 14 may deal with data of a bit plane by a method other than these.

Figure 14:
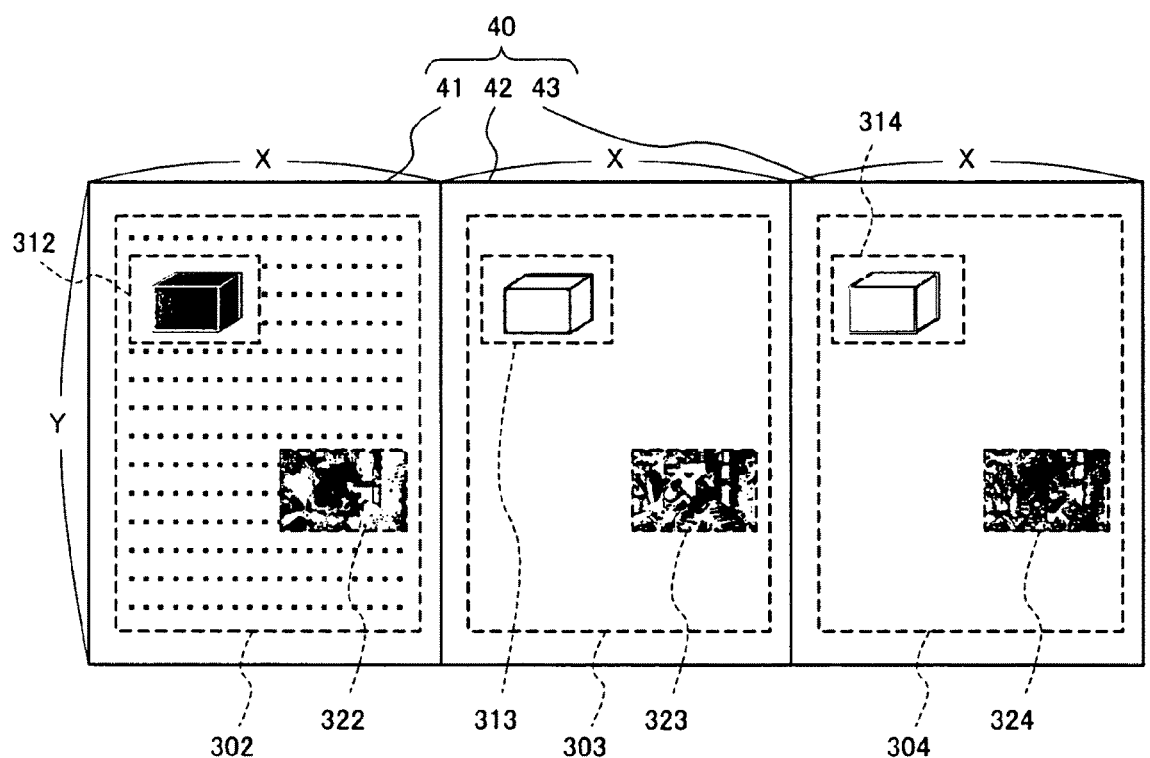
FIG. 14 is a diagram showing a bit plane generated according to the first exemplary embodiment of the present invention.

In the first exemplary embodiment, the bit plane conversion unit 14 integrates a plurality of bit planes into one bit plane. That is, as shown in FIG. 14, the bit plane conversion unit 14 develops the image data 3 which consists of pixels of X dots by Y dots into three bit planes 41, 42 and 43. Then, the bit plane conversion unit 14 lays the three bit planes side-by-side, and generates one bit plane 40 whose area is 3X dots by Y dots.

Here, a bit plane when performing table conversion and a bit plane when not performing table conversion will be compared.

In FIG. 7, bit planes 306-308 are bit planes of a character region when not performing table conversion.

As shown in FIG. 5B, in the distribution of pixels of the character region 301 converted into 3 bits, the frequencies of the intensity 0 and the intensity 7 are high. When table conversion is not performed, "000" and "111" are assigned to a pixel of the intensity 0 and the intensity 7, respectively. As a result, the character appears on each plain of bit 0, bit 1 and bit 2 like the bit planes 306-308 of FIG. 7.

By table conversion, "000" and "001" are assigned to the intensity 0 and the intensity 7 which have a high appearance frequency, respectively. As a result, the character appears only on a bit plane 302 of bit 0.

Thus, the table conversion unit 12 performs a conversion processing to a bit plane 301 of a character region using the conversion table 130 for character regions indicated on FIG. 6. In a character region, there are a lot of portions considered as solid area. Therefore, the frequencies of the pixel of the intensity 0 and the intensity 7 become high. Accordingly, the table conversion unit 12 makes the bit strings corresponding to the intensity 0 and the intensity 7 which have a large appearance ratio "000" and "001", respectively, and assigns a bit string other than these as the value of intensity with a low appearance ratio. As a result, components of the intensity 7 do not appear any more on bit planes 303 and 304 of other bits, bit 1 and bit 2. Then, in contrast with the bit planes 307 and 308 when not performing table conversion, a character portion does not appear any more on bit planes 303 and 304. In this way, the table conversion unit 12 makes data be concentrated in the bit plane 302 for bit 0.

Generally, when screen processing is performed for a graphic region and a photograph region, frequency of appearance of pixels is different from a case when screen processing is performed for a character region. For example, in the graphic region 311 shown in FIG. 10 and the photograph region 321 shown in FIG. 13, frequency of appearance of pixels of low intensity may come to be higher than that of in a character region. For this reason, the table conversion unit 12 performs table conversion for these regions using a conversion table different from one used in a character region. As a result, pixels having intensity of a high frequency of appearance can be assigned to a specific bit plane like a case of a character region.

For example, as shown in FIG. 8B, the graphic region 311 has pixels of high frequency of appearance at the intensity 0 and at the intensity 3. When data of these intensities are converted using the conversion table 131, the bit string of the intensity 3 becomes "001" and the bit string of the intensity 0 becomes "000". As a result, components of the intensity 3 appear only on a bit plane 312 of bit 0. Components of the intensity 0 and the intensity 3 do not appear on bit planes 313 and 314 of the other bits, bit 1 and bit 2. The intensity 6 and intensity 7 which are for a dark color portion are converted into "110" and "100", respectively. For this reason, pixels of the intensity 6 and intensity 7 do not appear on the bit plane 312 of bit 0. As a result, gray portions of the side faces of the graphic of the graphic region 311 appear only on the bit plane 312 of bit 0. This is different from the case when table conversion is not performed where gray portions of the side faces of the graphic of the graphic region 311 appear on a bit plane 317 of bit 1.

Also, as shown in FIG. 11B, the photograph region 321 has high frequency of appearance at the intensity 3-6. When the conversion table of FIG. 12 is used, the pixels of intensity 5 which have the highest frequency of appearance are converted into "000". Also, components of the intensity 3 are concentrated in bit 1, because the pixels of intensity 3 are converted into "010". Similarly, the components of intensity 4 are concentrated in bit 0 and the components of intensity 6 are concentrated in bit 2. Therefore, components of intensity with high frequency of appearance less appear on two or more bit planes 322, 323 and 324.

The binary-compression unit 15 indicated in FIG. 2A performs binary-compression processing for each bit plane developed by the bit plane conversion unit 14 to generate compressed data. As an example of a binary-compression method used by the binary-compression unit 15, binary entropy coding methods such as MH (Modified Huffman), MR (Modified Read), MMR (Modified Modified Read) and JBIG (Joint Bi-level Image experts Group) are known. Besides, original entropy coding methods also exist.

Processing of these binary coding methods is simple. For this reason, the size of a circuit for compression of a bit plane can be made small. Even when binary coding is realized by software, a high-performance computing circuit is not needed.

By table conversion mentioned above, the intensity of a high appearance ratio can be assigned to a specific bit plane. As a result, compression efficiency by a binary-compression unit improves.

Then, attribute information and compressed data generated by the binary-compression unit 15 is outputted to an image output unit.

Meanwhile, CPU (Central Processing Unit) 101 controls the image compression unit 1 following a program stored in the program memory 102. Here, the CPU 101 may carry out operation of the image compression unit 1 mentioned above by a program.

The image output unit P is connected with the computer C by USB (Universal Serial Bus). In the first exemplary embodiment, the image output unit P is a printer. The image output unit P is provided with an image decompression unit 2 which obtains image data through decompression of compressed data compressed by the image compression unit 1, and an image printing unit 6 which prints image data obtained by an image decompression unit 2 on a predetermined sheet.

FIG. 2B is a diagram showing an image decompression unit according to the first exemplary embodiment. The image decompression unit 2 is an image decompression unit of the present invention and includes a binary decompression unit 20, a data restoration unit 21, a table inverse conversion unit 22 and a table storing memory 23.

The binary decompression unit 20 performs decompression processing for inputted compressed data and restores the bit plane 40. Decompression processing in the binary decompression unit 20 is inverse processing of the compression processing in the binary-compression unit 15.

The image data restoration unit 21 restores the image data 3 from the bit plane 40. In the first exemplary embodiment, the data restoration unit 21 separates bit planes 41, 42 and 43 of bit 0, bit 1 and bit 2 from one bit plane 40. Then, the data restoration unit 21 obtains the image data 3 from these bit planes.

The table inverse conversion unit 22 performs inverse-conversion of the table conversion for the image data 3 using the conversion table 130, 131 and 132 inversely. As a result, the bit string of a pixel is restored to the bit string before the table conversion by the image compression unit 1.

The table storing memory 23 in which the conversion table 130, 131 and 132 are stored is connected to the table inverse conversion unit 22.

The table storing memory 23 is a storage device composed of a semiconductor memory and the like. The table storing memory 23 stores the conversion table 130, 131 and 132 like the table storing memory 13 on the image compression unit 1.

On the basis of attribute information on an image, the table inverse conversion unit 22 reads the conversion table 130, 131 and 132 from the table storing memory 23 corresponding to an attribute. Then, the table inverse conversion unit 22 performs the inverse-conversion of the table conversion for the image data 3 using these conversion tables.

By the above, the table inverse conversion unit 22 restores image data after screen processing. Then, the table inverse conversion unit 22 outputs the restored image data and the attribute information to the image printing unit 6.

According to the intensity of each pixel of the image data 3, the image printing unit 6 prints the image on a predetermined sheet such as a printing paper.

The image printing unit 6 may improve picture quality of image data by performing image processing such as multi level processing, PWM (Pulse Width Modulation) or the like for an image just before the printout and perform predetermined print on the basis of this image data.

As a printing method of an image, the inkjet printing method, the laser method, the sublimation type thermal ink-transfer printing method, the silver-halide printing method, the direct thermal recording method and the thermal ink-transfer printing method can be used, for example.

Using the table inverse conversion unit 22 of the image decompression unit 2, an image processing system of the first exemplary embodiment performs inverse-conversion on the basis of attribute information. The table inverse conversion unit 22 acquires attribute information from the image compression unit 1 for the inverse-conversion. Accordingly, the image printing unit 6 can restore image data with a high precision.

Next, operation of the image processing system S1 according to the first exemplary embodiment will be described.

First, the image processing system S1 generates the image data 3 and attribute information in the image data generation unit 5 of the computer C on the basis of document data. At this stage, in image data, the intensity of each pixels are expressed in 8 bits.

The generated image data 3 and attribute information is inputted to the image compression unit 1.

The image compression unit 1 performs screen processing for the inputted image data 3 of intensity of 8-bits using the screen processing unit 10 to make the image data 3 of intensity of 3-bits. On this occasion, the screen processing unit 10 identifies a region of target pixels of screen processing on the basis of attribute information. Then, the screen processing unit 10 performs screen processing of the content corresponding to the attribute of the region of processing target pixels.

Next, the image data 3 of 3-bits and the attribute information is inputted to the table conversion unit 12.

The table conversion unit 12 identifies the region of pixels of a processing target on the basis of attribute information. Then, the table conversion unit 12 converts the pixels into predetermined bit strings using the conversion table 130, 131 and 132 according to the attribute of each region.

That is, the table conversion unit 12 converts pixels of the character region 301 using the conversion table 130 for text regions. Also, the table conversion unit 12 converts pixels of the graphic region 311 using the conversion table 131 for graphic regions. Further, the table conversion unit 12 converts pixels of the photograph region 321 using the conversion table 132 for photograph regions.

Then, the image data 3 to which table conversion has been performed is inputted to the bit plane conversion unit 14.

The bit plane conversion unit 14 develops the image data 3 into three bit planes 41, 42 and 43 corresponding to a digit of the bit string of each pixel. In the first exemplary embodiment, bit 0, bit 1 and bit 2 are developed into bit planes 41, 42 and 43, respectively. The bit plane conversion unit 14 integrates these bit planes into the single bit plane 40 by lining and combining these, and inputs the bit plane 40 to the binary-compression unit 15. The binary-compression unit 15 performs compression processing of the inputted bit plane 40 and obtains compressed data.

The compressed data and attribute information is outputted to the image output unit P via a USB cable.

When compressed data and attribute information is inputted to the image output unit P, the binary decompression unit 20 performs decompression processing of the compressed data and obtains the bit plane 40. Then, the binary decompression unit 20 inputs this bit plane 40 to the data restoration unit 21. Here, the image output apparatus P acquires attribute information from the image compression unit 1. However, the image output apparatus P may acquire attribute information from the image data generation unit 5.

The data restoration unit 21 separates an inputted bit plane into the bit planes 41, 42 and 43 of bit 0, bit 1 and bit 2. Then, the data restoration unit 21 restores the image data 3 from these bit planes. The restored image data 3 and the attribute information obtained from the computer C is inputted to the table inverse conversion unit 22.

The table inverse conversion unit 22 selects a conversion table for pixels of a processing object according to the attribute of a region, and performs inverse conversion to restore an original bit string.

That is, the table inverse conversion unit 22 performs the inverse conversion of the table conversion for pixels of the character region 301 using the conversion table 130 for character regions. Also, the table inverse conversion unit 22 performs the inverse conversion of the table conversion for pixels of the graphic region 311 using the conversion table 131 for graphic regions. Further, the table inverse conversion unit 22 performs the inverse conversion of the table conversion for pixels of the photograph region 321 using the conversion table 132 for photograph regions.

The image data 3 inverse-converted is outputted to the image printing unit 6.

The image printing unit 6 performs multi level processing for the inputted image data 3 on the basis of the attribute information and restores highly precise image data. After that, the image printing unit 6 prints the image on the basis of this image data 3.

As it has been described above, the table conversion unit 12 performs conversion processing in advance for pixels of a processing object on the basis of the conversion tables 130, 131 and 132 in which a bit string corresponding to the intensity of color is correlated to a predetermined bit string corresponding to the frequency of appearance of the intensity. Then, the bit plane conversion unit 14 develops bit strings for which conversion processing has been performed into the bit planes 41, 42 and 43. Also, the bit plane conversion unit 14 integrates the bit planes 41, 42 and 43 into the single bit plane 40. The binary-compression unit 15 performs binary-compression of the bit plane 40. As a result, the compression efficiency of the binary-compression unit 15 can be improved, because the bit strings with a high frequency of appearance less appear on two or more bit planes.

Also, even if images of various attributes such as a character, a graphic and a photograph are intermingled in the image data 3, the table conversion unit 12 converts the data into predetermined bit strings using a conversion table according to the attribute of a region on the basis of attribute information. The compression efficiency for image data can be improved also by this.

In an image processing system of the first exemplary embodiment, the screen processing unit 10 performs screen processing for multi level image data according to attribute information. For this reason, allocation of pixel data to a bit plane can be made biased for each type of attribute information.

That is, even when an attribute is varied locally in the image data 3, an image processing system of the first exemplary embodiment can bias allocation of pixel data flexibly. Accordingly, when the bit plane 40 after being processed by the bit plane conversion unit 14 is compressed by the binary-compression unit 15, the binary compression efficiency is improved. As a result, the data transfer volume from an image compression unit to the image decompression unit can be reduced.

Existing methods known well can be applied as the binary-compression coding method of the binary-compression unit 15. For this reason, a binary-compression unit can also be realized using a simple circuit or a program executed on a computing unit of low performance. For example, when a binary-compression unit is realized by a binary coding circuit, it is possible to operate the circuit at high speed and thus real-time processing is realized easily. At the time of decompression in the image decompression unit 2, it can be processed contrary to that of the compression simply. Such processing can be realized by a simple circuit or a program running on a computing unit of low performance like the compression process. As a result, it is possible to restore and output an image without running late for the print speed of a printing means.

Meanwhile, in the first exemplary embodiment, it is configured that the image compression unit 1 outputs the compressed data and the attribute information to the image decompression unit 2 separately.

However, in the first exemplary embodiment, it is also possible to embed the attribute information in the compressed data itself as metadata. For example, the image compression unit 1 may arrange the attribute information at the head of the compressed data. That is, the image compression unit 1 may arrange the compressed data next to the attribute information, and output the combination to the image decompression unit 2. The image decompression unit 2 pulls out the attribute information from the head of the received data, and inputs it to the table inverse conversion unit 22. On this occasion, the image decompression unit 2 decompresses in the binary decompression unit 20 the remaining compressed data after extraction of the attribute information. In this way, it is possible to manage attribute information along with compressed data in an integrated manner. As a result, data processing in an image processing system becomes simpler. Further, attribute information may be compressed or may not be compressed.

2. Second Exemplary Embodiment

Next, an image processing system S2 of the second exemplary embodiment of the present invention will be described with reference to FIG. 1B, FIG. 15A and FIG. 15B.

Figure 1B:
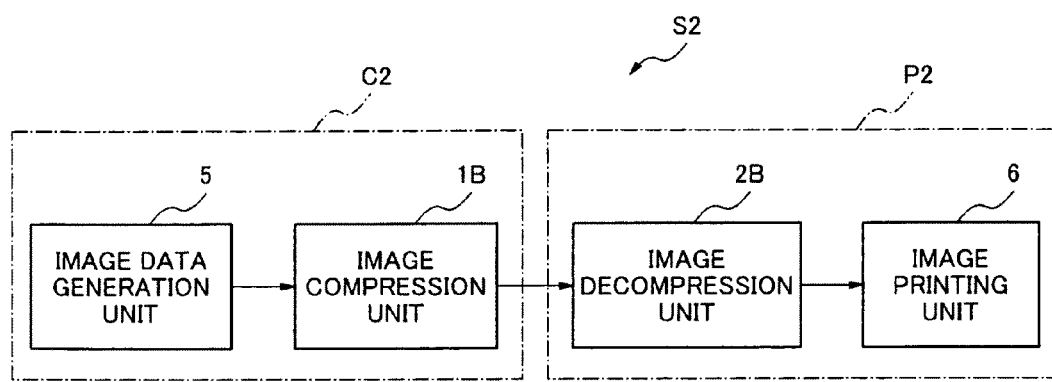
FIG. 1B is a diagram showing the configuration of an image processing system which is a second exemplary embodiment of the present invention.

FIG. 1B is a block diagram of the image processing system S2 of the second exemplary embodiment of the present invention.

FIG. 15A is a diagram showing an image compression unit according to the second exemplary embodiment. FIG. 15B is a diagram showing an image decompression unit in the second exemplary embodiment.

As shown in FIG. 1B, the image processing system of the second exemplary embodiment includes a computer C2 and an image output apparatus P2. The computer C2 is provided with an image data generation unit 5 and an image compression unit 1B. Further, the image output apparatus P2 includes an image decompression unit 2B and an image printing unit 6.

As shown in FIG. 15A, the image compression unit 1B includes a screen processing unit 10, a screen pattern memory 11, a table conversion unit 12 and a table storing memory 13. The image compression unit 1B is also provided with a bit plane conversion unit 14, a binary-compression unit 15, a temporary memory 16 and a data analysis unit 17.

The image compression unit 1B further includes a CPU 101 and a program memory 102.

The image compression unit 1B is different from the image compression unit 1 of the first exemplary embodiment in the point that it is equipped with the data analysis unit 17 and the temporary memory 16. The image compression unit 1B is also different from the first exemplary embodiment in the point that it outputs data of a conversion table in addition to compressed data and attribute information to the image decompression unit 2.

As shown in FIG. 15B, the image decompression unit 2B is different from the image decompression unit 2 of the first exemplary embodiment in the point that a conversion table is inputted from outside to the table storing memory 23.

The data analysis unit 17 is a conversion table generation unit in the first exemplary embodiment. Image data and attribute information outputted from the screen processing unit 10 is inputted to the data analysis unit 17. The data analysis unit 17, on the basis of the inputted image data and attribute information, analyzes the frequency of appearance of intensity in the image data converted by the screen processing unit 10 on a region-by-region basis. In the second exemplary embodiment, the intensity of image data which the screen processing unit 10 outputs is expressed in 3 bits. Then, the data analysis unit 17 generates a conversion table by which effective compression becomes available on the basis of the analysis result.

For inputted image data, the data analysis unit 17 of this exemplary embodiment collects statistical data of the frequency of appearance of each intensity on a region-by-region basis. Such collection of statistical data may be performed on a page-by-page basis. Or, collection of statistical data may be carried out on a band-by-band basis such as in units of 256 lines and 1024 lines.

The data analysis unit 17 creates a conversion table using the collected statistical data. This conversion table is created such that the higher the frequency of appearance of pixels having an intensity is, the less the number of bit planes on which the pixels having that intensity appear is.

The data analysis unit 17 creates conversion tables similar to the conversion tables 130, 131 and 132 shown in FIG. 6, FIG. 9 and FIG. 12 in the first exemplary embodiment.

In creating conversion tables in the data analysis unit 17, in the case of multi level data of three bits, "000" is assigned to an intensity with the highest frequency. Also, "001" is given to an intensity which has the second highest frequency of appearance, "010" to the third highest and "111" to the lowest. In this way, the data analysis unit 17 creates a conversion table.

According to the second exemplary embodiment, the number of bits that indicates the intensity of an image after screen processing is three. However, the number of bits may be two or any of from four to seven. Also, a conversion table may be created using a procedure in which "000" is assigned for conversion of the intensity 0 fixedly and "001", "010", "100" . . . and "111" are assigned for conversion of bit strings which express the other intensity according to their frequency of appearance.

Thus, the data analysis unit 17 creates a conversion table (130, 131 and 132) on the basis of the frequency of appearance of each levels of intensity. On this occasion, the data analysis unit 17 may generate a histogram of the first exemplary embodiment shown in FIG. 5B, FIG. 8B and FIG. 11B also in the second exemplary embodiment.

The temporary memory 16 stores image data and attribute information outputted from the screen processing unit 10 temporarily until analysis of image data by the data analysis unit 17 ends. When the data analysis unit 17 finishes generating conversion tables, the temporary memory 16 outputs the stored image data and attribute information. The image data and attribute information outputted from the temporary memory 16 is inputted to the table conversion unit 12.

The table storing memory 13 stores the conversion tables created by the data analysis unit 17.

The conversion tables generated by the data analysis unit 17 are outputted to the image decompression unit 2B. The conversion tables are also stored in a table storing memory 23 inside the image decompression unit 2B.

The composition and the functions of the image processing system S2 of this exemplary embodiment other than the above are the same as those of the first exemplary embodiment. Same parts as those of the first exemplary embodiment are designated by same symbols in diagrams, and detailed description is omitted.

Further, in the image compression unit 1B, the function of the image compression unit mentioned above may be realized in a program which controls the CPU 101 like the first exemplary embodiment.

Next, operation of the image processing system S2 will be described.

The image processing system S2 generates image data and attribute information in the image data generation unit 5 of the computer C2 like the first exemplary embodiment. Then, the image processing system S2 inputs the generated image data and attribute information to the image compression unit 1B. The screen processing unit 10 of the image compression unit 1B performs screen processing to the inputted image data.

The screen processing unit 10 outputs the image data of three bits and the attribute information to the temporary memory 16 and the data analysis unit 17.

The temporary memory 16 stores the image data and attribute information temporarily. The data analysis unit 17 analyzes the image data which the screen processing unit 10 has outputted. Then, according to the attribute of each region of the image data, the data analysis unit 17 creates conversion tables. The conversion tables created by the data analysis unit 17 are outputted to the table storing memory 13 and to the table storing memory 23 of the image decompression unit 2. The table storing memory 13 and the image decompression unit 2 store the conversion tables created by the data analysis unit 17.

The table conversion unit 12 identifies a region in which each pixel of a processing object is located on the basis of the attribute information. Then, the table conversion unit 12 converts a pixel into a predetermined bit string using a conversion table corresponding to the attribute of each region. On this occasion, the table conversion unit 12 uses a conversion table generated by the data analysis unit 17.

The image data for which table conversion has been performed is inputted to the bit plane conversion unit 14 and is converted into a bit plane. The binary-compression unit 15 performs compression processing of this bit plane and obtains compressed data.

The image compression unit 1B outputs the conversion tables, compressed data and attribute information to the image output apparatus P2.

The image output apparatus P2 stores the conversion tables in the table storing memory 23 of the image decompression unit 2B. The binary decompression unit 20 performs decompression processing of the inputted compressed data and restores bit plane data.

The multi level data restoration unit 21 restores image data on the basis of the restored bit plane data. The restored image data and attribute information is inputted to the table inverse conversion unit 22.

The table inverse conversion unit 22 identifies which region a pixel of a processing object is located in on the basis of the attribute information. Then, the table inverse conversion unit 22 performs inverse conversion which restores the bit string of each pixel to the original bit string using a conversion table according to the attribute of each region.

On this occasion, the table inverse conversion unit 22 uses the conversion tables generated by the data analysis unit 17. Then, the table inverse conversion unit 22 outputs the image data inverse-converted to the image printing unit 6. The image printing unit 6 prints the image data which the table inverse conversion unit 22 has outputted.

As it has been described above, the image processing system S2 of the second exemplary embodiment analyzes characteristics of an image according to the type of multi level image data which is inputted and an attribute in the image data, and creates a conversion table dynamically. That is, even if various kinds of image data are inputted, the image compression unit 1 can create a conversion table each time. As a result, the image processing system S2 of the second exemplary embodiment has the effect that an image can be compressed more efficiently in addition to the effect described in the first exemplary embodiment.

The image processing system S2 of the second exemplary embodiment creates a conversion table on the basis of data for which screen processing has been performed and its attribute information. As a result, there is also the effect that even if regions of various attributes are intermingled in image data, a conversion table corresponding to the attributes of actual image data can be generated.

By these, the image processing system S2 of the second exemplary embodiment is able to improve the compression performance.

Further, in the second exemplary embodiment, a conversion table which the data analysis unit 17 created is used when the image decompression unit 2B decompresses image data. That is, the amount of processing of the image decompression unit 2B is the same as that of the first exemplary embodiment. For this reason, real-time processing is also possible in the second exemplary embodiment like the first exemplary embodiment.

Meanwhile, in the second exemplary embodiment, it is configured that the image compression unit 1B inputs conversion tables created in the data analysis unit 17 and compressed data to the image decompression unit 2B separately. However, in the second exemplary embodiment, it is also possible that a conversion table can be embedded in compressed data itself as metadata. For example, the image compression unit 1B may arrange a conversion table at the head of compressed data. That is, the image compression unit 1 may arrange compressed data next to a conversion table and output the mix to the image decompression unit 2B. The image decompression unit 2B extracts the conversion table out from the head of the received data and stores in the table storing memory 23. The image decompression unit 2B decompresses the compressed data remaining after the extraction of the conversion table portion using the binary decompression unit 20. In this way, a conversion table can be managed integral with compressed data. As a result, data processing in the image processing system S2 becomes simpler. The data of a conversion table may be compressed or may not be compressed.

The attribute information may be included in metadata embedded in compressed data itself as it has been described in the first exemplary embodiment.

In the second exemplary embodiment, it is configured that the image compression unit 1 is provided with the temporary memory 16. However, the temporary memory 16 can be omitted when a conversion table is stored in the table storing memory 23 before compressed data is inputted to the table inverse conversion unit 22 by speeding up of processing of the data analysis unit 17.

For example, the data analysis unit 17 may analyze image data in units of a predetermined band such as of every 256 lines, and use the analysis result for table conversion of the next band. As a result, without using the temporary memory 16, the image compression unit 1 can follow a change in an image to create a table.

3. Third Exemplary Embodiment

Next, an image processing system according to the third exemplary embodiment of the present invention will be described.

Figure 16:
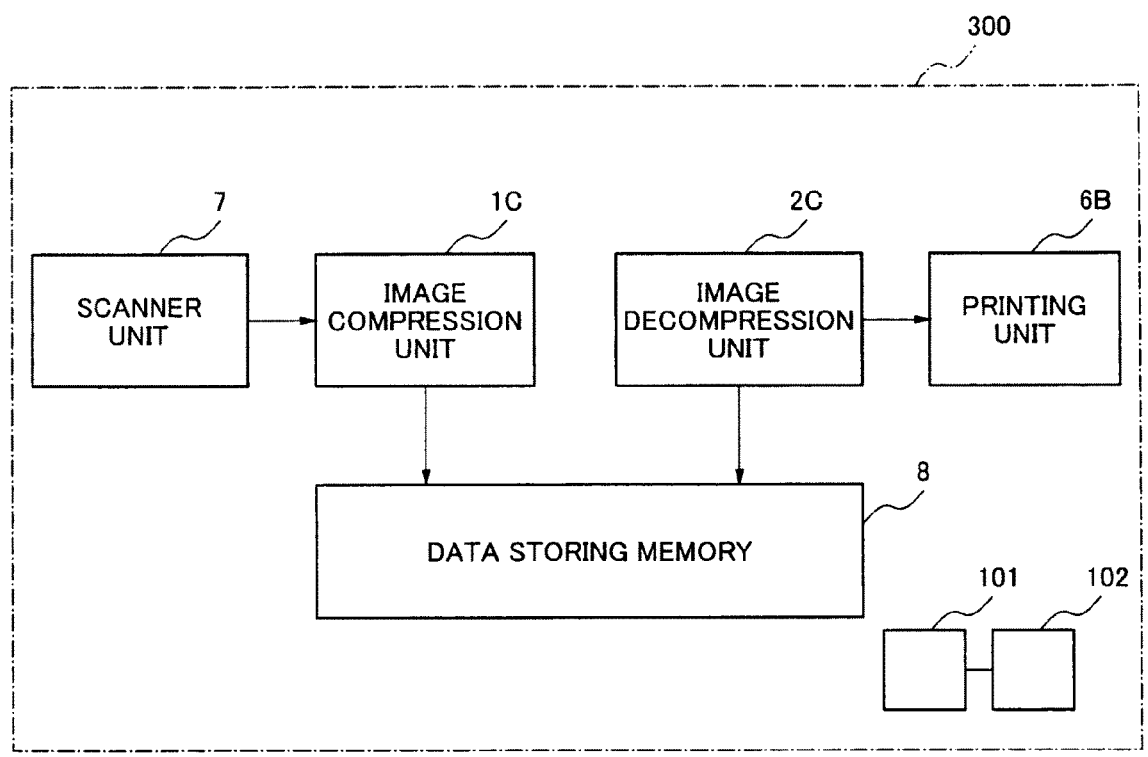
FIG. 16 is a diagram showing an image processing system of the third exemplary embodiment of the present invention.

FIG. 16 is a general block diagram showing an image processing system according to the third exemplary embodiment. FIG. 17 is a functional block diagram showing an image compression unit of an image processing system according to the third exemplary embodiment.

The image processing system of the third exemplary embodiment is MFP. A MFP 300 has a plurality of functions such as a printer and a scanner. MFP 300 includes an image compression unit 1C and an image decompression unit 2C almost the same as the image compression unit 1 and the image decompression unit 2 described in the first or second exemplary embodiment. The MFP 300 also includes a scanner unit 7 which reads a document text, a graphic and a photograph indicated on a medium such as a paper, and a printing unit 6b which prints an image on a sheet such as a predetermined paper.

The MFP 300 is different from an image processing system of the first and second exemplary embodiment in the point that it is equipped with a data storing memory 8 storing compressed data and the like temporarily between the image compression unit 1C and the image decompression unit 2C.

Image data which the scanner unit 7 read is inputted to the image compression unit 1C. The image compression unit 1C is equipped with an attribute information acquisition unit 18 which acquires attribute information from the inputted image data.

The attribute information acquisition unit 18 identifies a region in the image data by performing edge detection processing, for example. Then, the attribute information acquisition unit 18 calculates statistics information on the intensity of pixels in this region. The statistics information may be the histograms described in FIG. 5A, FIG. 8A and FIG. 11A of the first exemplary embodiment. The attribute information acquisition unit 18 identifies an attribute using attribute data in which a pattern of statistics of the intensity of pixels and a predetermined attribute similar to that pattern is correlated and which is prepared in advance. The attribute information acquisition unit 18 acquires attribute information on image data on the basis of a region and the attribute of the region obtained in this way.

When printing the image data formed in the MFP 300, it is possible to create attribute information through printer emulation by the MFP 300. On the other hand, when image data is scanned by a copy machine or a scanner, attribute information can be generated by performing edge detection and separation of image regions for the scanned image.

Next, operation of the MFP 300 will be described.

When the certain number of copies of documents is printed from a document of a plurality of pages using the MFP 300, the scanner unit 7 reads each page of the document and obtains image data of the each page.

These pieces of image data are inputted to the attribute information acquisition unit 18 of the image compression unit 1C in turn. The image compression unit 1C obtains attribute information on image data on a page-by-page basis. After that, the image compression unit 1C performs image compression processing like the first or second exemplary embodiment.

The data storing memory 8 stores the compressed data and attribute information on each page.

The image decompression unit 2C reads the compressed data and attribute information from the data storing memory 8 in order of the page of the document. The image decompression unit 2C performs decompression processing of the compressed image like the first or second exemplary embodiment. As a result, the image decompression unit 2C obtains image data to be printed. Then, the image decompression unit 2C outputs the image data to be printed to the printing unit 6b and the data is printed.

As it has been described above, because the compression efficiency of compressed data is improved by the processing of the image compression unit, the MFP 300 that is an image processing system of the third exemplary embodiment can store image data without increasing consumption of the capacity of the data storing memory.

Meanwhile, the above-mentioned functions of the MFP 300 can also be realized by a program. That is, the third exemplary embodiment can also be realized by a program which is stored in the program memory 102 and is executed by the CPU 101 like the first or second exemplary embodiment.

In an image processing system of each of the first to third exemplary embodiments, processing has been described as a case where pixel data of image data is of a gray image. However, the present invention can also be applied in the case of a color image in which color space is expressed by RGB (Red, Green, Blue), CMY (Cyan, Magenta, Yellow), CMYK (Cyan, Magenta, Yellow, Key) or the like. In the case of a color image, to each pixel data of image data, the same processing as the above-mentioned is performed for each intensity data of each color component corresponding to the color space.

For example, in the case of color image data with color space of CMYK, the image compression unit 1 stores screen patterns corresponding to each color component, C, M, Y and K, in the screen pattern memory in advance using the screen processing unit. Then, the screen processing unit 10 performs screen processing for each component of color. The table storing memory stores conversion tables corresponding to each color component of C, M, Y and K. The table conversion unit performs table conversion for each of these color components. The bit plane conversion unit and binary-compression unit also perform processing for each color component and generate compressed data.

For each color component, the image decompression unit performs processing to the compressed data using the binary decompression unit, data restoration unit and table inverse conversion unit. As a result, color image data is restored.

Although, in the first and second exemplary embodiment, the description has been made as a system where an image compression unit and an image decompression unit exist as independent separate components, it may also be composed as an integrated system like a Multi Function Peripheral of the third exemplary embodiment.

In the above-mentioned exemplary embodiments, a screen processing unit performs downward conversion (color reduction) of a bit string representing the intensity of each pixel from 256 levels of intensity (8 bits) to eight levels of intensity (3 bits). However, color reduction is not limited to this. For example, color reduction from 256 levels of intensity to four levels of intensity (2 bits) or color reduction from 256 levels of intensity to 16-128 levels of intensity (4-7 bits) is also possible. In this case, 2 bits and 4-7 bits are set to the number of digits of the conversion table according to this.

Further, in the present exemplary embodiments, an image compression unit and an image decompression unit are connected via a USB to transmit compressed data and the like. However, image data may be transmitted using a standard interface such as the Centronics interface, a dedicated interface or an existing communication means such as a PCI (Peripheral Component Interconnect) bus and other original buses.

A communication apparatus having a communication module such as a fax may include the above-mentioned image compression unit and image decompression unit. Also, compressed data may be transferred between an image compression unit and an image decompression unit via a public telecommunications network.

4. Fourth Exemplary Embodiment

Next, an image compression unit according to the fourth exemplary embodiment of the present invention will be described.

Figure 18:
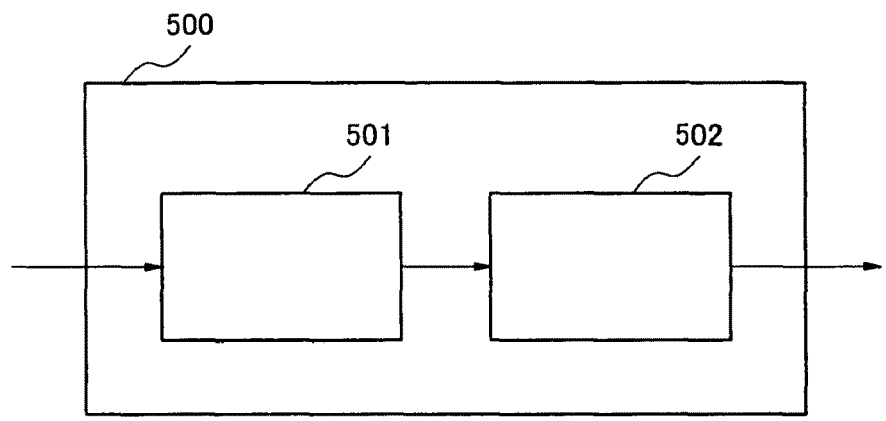
FIG. 18 is a diagram showing an image compression unit of the fourth exemplary embodiment of the present invention.

FIG. 18 is a block diagram showing a configuration of an image compression unit of the fourth exemplary embodiment. In the block diagram of FIG. 18, an image compression unit 500 includes a preprocessing unit 501 and a bit string conversion unit 502.

Figure 19:
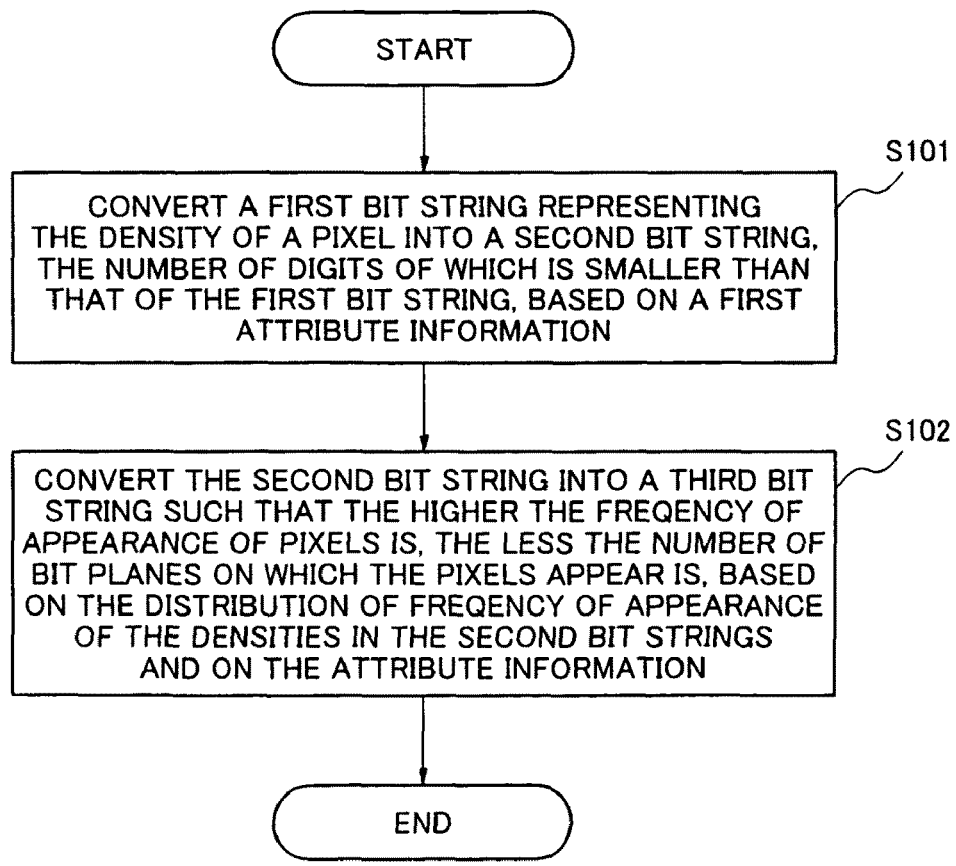
FIG. 19 is a flowchart showing operation of an image compression unit of the fourth exemplary embodiment of the present invention.

FIG. 19 is a flowchart showing operation of an image compression unit of the fourth exemplary embodiment.

The operation of the fourth exemplary embodiment will be described using FIG. 18 and FIG. 19.

The preprocessing unit 501 performs preprocessing for converting a first bit string representing the intensity of the pixel corresponding to each of a plurality of pixels of which image data is composed into a second bit string, the number of digits of which is smaller than that of the first bit string, based on a predetermined region included in the image data and a first attribute information for identifying the attribute of the predetermined region, with the processing being associated with the predetermined region of the image data (S101).

The bit string conversion unit 502 converts the second bit string into the third bit string based on the distribution of frequencies of appearance of the intensity in the second bit strings and on the first attribute information (S102).

Here, in Step S102, the bit string conversion unit 502 converts a second bit string into a third bit string such that the higher the frequency of appearance of pixels is, the less the number of bit planes on which the pixels appear is.

That is, an image compression unit of the fourth exemplary embodiment converts the first bit string of which a pixel of an inputted image is composed into the second bit string having the number of digits which is smaller based on attribute information. Further, an image compression unit of the fourth exemplary embodiment converts the second bit string into the third bit string based on intensity distribution and attribute information of a pixel such that the higher the frequency of appearance of pixels having an intensity is, the less the number of bit planes on which the pixels having that intensity appear is.

As a result, an image compression unit of the fourth exemplary embodiment can compress a bit plane generated from the third bit string at a high compression ratio. Accordingly, an image compression unit described in FIG. 18 has the effect that an issue to perform compression processing of a bit plane with a high efficiency is solved.

5. Fifth Exemplary Embodiment

Figure 20:
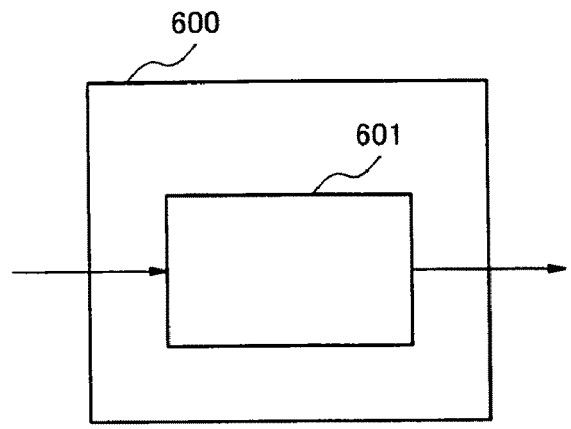
FIG. 20 is a diagram showing an image decompression unit of the fifth exemplary embodiment of the present invention.

Next, an image decompression unit according to the fifth exemplary embodiment of the present invention will be described. FIG. 20 is a block diagram showing an image decompression unit of the fifth exemplary embodiment. In FIG. 20, an image decompression unit 600 has a bit string inverse conversion unit 601.

Figure 21:
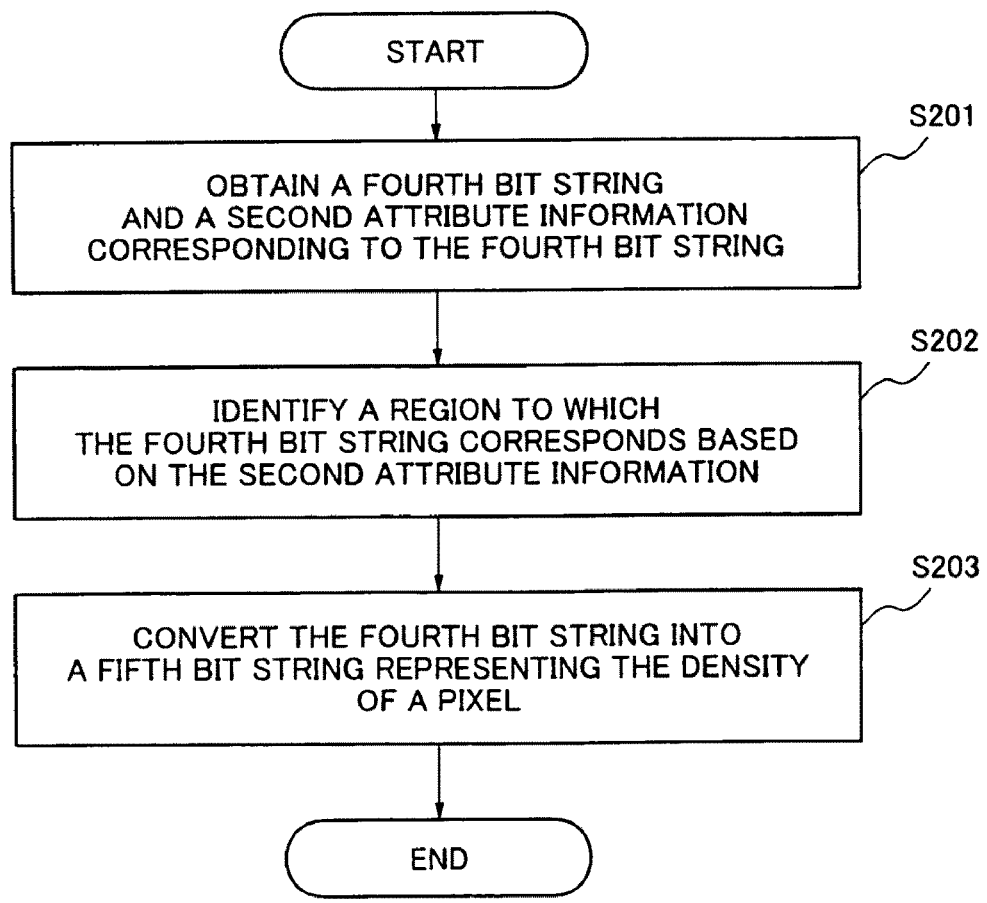
FIG. 21 is a flowchart showing operation of an image decompression unit of the fifth exemplary embodiment of the present invention.

FIG. 21 is a flowchart showing operation of the image decompression unit 600 of the fifth exemplary embodiment.

Operation of the fifth exemplary embodiment will be described using FIG. 20 and FIG. 21.

The bit string inverse conversion unit 601 obtains a fourth bit string and second attribute information corresponding to the fourth bit string (S201).

Then, the bit string inverse conversion unit 601 identifies a region to which the fourth bit string corresponds based on the second attribute information (S202).

The bit string inverse conversion unit 601 converts, for each identified region, the fourth bit string into a fifth bit string representing the intensity of a pixel (S203).

That is, an image decompression unit of the fifth exemplary embodiment converts an inputted bit string into a bit string representing the intensity of a pixel based on the inputted attribute information. Accordingly, for example, even when an inputted bit string is not a bit string representing the intensity of a pixel intended to improve the processing efficiency, the inputted bit string can be converted into a bit string representing the intensity of a pixel based on attribute information and a second conversion table.

6. Sixth Exemplary Embodiment

Figure 22:
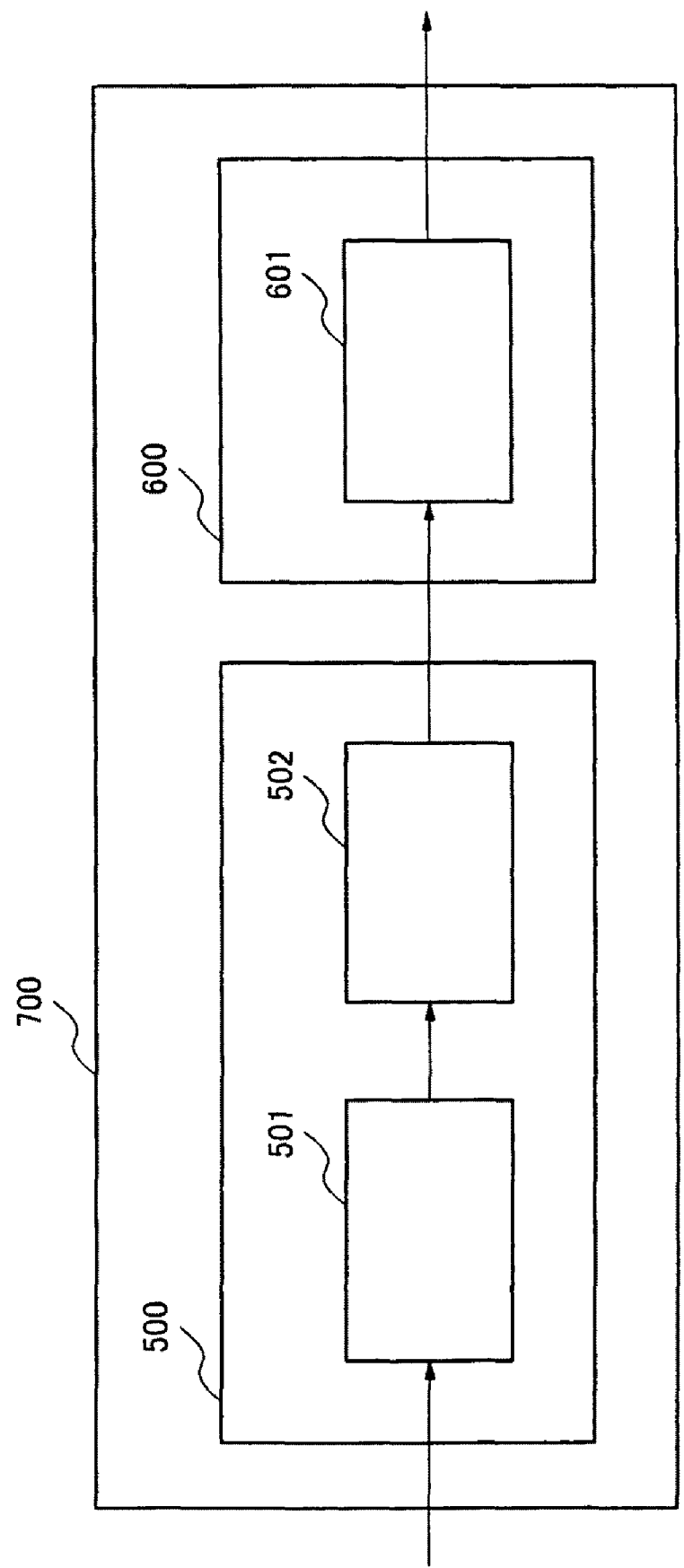
FIG. 22 is a diagram showing an image processing system of the sixth exemplary embodiment of the present invention.

Next, an image processing system according to the sixth exemplary embodiment of the present invention will be described. FIG. 22 is a block diagram showing an image processing system of the sixth exemplary embodiment. In FIG. 22, an image processing system 700 includes the image compression unit 500 described in the fourth exemplary embodiment and the image decompression unit 600 described in the fifth exemplary embodiment.

The image compression unit 500 includes the preprocessing unit 501 and the bit string conversion unit 502. The image decompression unit 600 has the bit string inverse conversion unit 601. Here, because operation of the image compression unit 500 and the image decompression unit 600 is the same as that of the fourth exemplary embodiment and the fifth exemplary embodiment respectively, the overlapped description will be omitted.

In the image processing system 700 shown in FIG. 22, the image compression unit 500 outputs the third bit string and the first attribute information to the image decompression unit 600. Then, the image decompression unit 600 obtains the third bit string and the first attribute information as the fourth bit string and the second attribute information described in the fifth exemplary embodiment, respectively.

The bit string inverse conversion unit 601 performs inverse-conversion which is conversion opposite of that of the bit string conversion unit 502. That is, the bit string inverse conversion unit 601 converts the third bit string that the image compression unit 500 has generated into the fourth bit string representing the intensity of a pixel. As a result, the fourth bit string becomes a bit string restored to original state where conversion by the image compression unit 500 is not performed yet.

By having such structure, using the image compression unit 500, an image processing system of the sixth exemplary embodiment can generate a bit string which can be compressed with a high compression ratio.

As a result, because image data can be compressed with a high compression ratio by the image compression unit 500, an image processing system of the sixth exemplary embodiment can reduce the capacity required for storing and transmitting image data. Further, an image processing system of the sixth exemplary embodiment can restore bit strings inputted to the image compression unit 500, because the inverse conversion of the image compression unit 500 is performed in the image decompression unit 600.

The multi level image data compression equipment disclosed in Japanese Patent Application Laid-Open No. 2002-084425 performs bit plane conversion of image data only when many intermediate densities are included in multi level image data.

An image processing apparatus disclosed in Japanese Patent Application Laid-Open No. 2004-236295 switches a binary coding method and a multi level coding method according to a region of an image.

However, in the apparatus disclosed in Japanese Patent Application Laid-Open No. 2002-084425 and Japanese Patent Application Laid-Open No. 2004-236295, there is a problem that processing becomes complicated because different image encoding units are used while being switched.

An image encoding apparatus disclosed in Japanese Patent Application Laid-Open No. 2004-312773 compresses image data developed into a bit plane.

However, the image encoding apparatus disclosed in Japanese Patent Application Laid-Open No. 2004-312773 generates a bit plane using data generated from image data just as it is. As a result, an image encoding apparatus disclosed in Japanese Patent Application Laid-Open No. 2004-312773 has a problem that the compression efficiency of an image is not enough.

Japanese Patent Application Laid-Open No. 2006-343831 describes an image processing apparatus which determines the attribute of a sub block of an image based on the frequency of appearance of an object. However, the image processing apparatus disclosed in Japanese Patent Application Laid-Open No. 2006-343831 does not have the structure in which a conversion table for a bit plane is generated according to the frequency of appearance of the pixels.

An image output system disclosed in Japanese Patent Application Laid-Open No. 2007-088968 is an image output system in which multi level processing of an image is performed using attribute information.

However, in the image output system disclosed in Japanese Patent Application Laid-Open No. 2007-088968, there is a problem that processing becomes complicated, because a method of the multi level processing needs to be changed for each attribute information at the time of decompression of the image.

In the present invention, it is possible to perform compression processing of a bit plane developed from image data with a high efficiency without changing a method of image compression.

The previous description of embodiments is provided to enable a person skilled in the art to make and use the present invention. Moreover, various modifications to these exemplary embodiments will be readily apparent to those skilled in the art, and the generic principles and specific examples defined herein may be applied to other embodiments without the use of inventive faculty. Therefore, the present invention is not intended to be limited to the exemplary embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An image compression unit, comprising:
a preprocessing unit that performs preprocessing for converting a first bit string representing an intensity of each of a plurality of pixels of which image data is composed into a second bit string, a number of digits of which is smaller than a number of digits of the first bit string, based on a predetermined region included in the image data and a first attribute information for identifying an attribute of the predetermined region, with the preprocessing being associated with the predetermined region of the image data; and
a bit string conversion unit which converts the second bit string into a third bit string based on distribution of a frequency of appearance of the intensity in the second bit string and the first attribute information such that, for the pixel having a higher frequency of appearance of the intensity, a number of bit planes on which data of the pixel appear is less.

2. An image compression unit according to claim 1, further comprising:
a first table storing unit which stores a first conversion table, the first conversion table being configured by associating the second bit string and the third bit string which is assigned according to the frequency of appearance of the intensity of each of the pixel, wherein
the bit string conversion unit reads the first conversion table corresponding to an attribute of the region from the first table storing unit and converts the second bit string into the third bit string using the first conversion table read.

3. An image compression unit according to claim 2, further comprising:
a data analysis unit which performs analysis of the second bit string for each attribute based on the attribute information, and generates the first conversion table based on a result of the analysis.

4. An image processing system, comprising:
the image compression unit according to claim 2; and
an image decompression unit, wherein
the image compression unit outputs the third bit string and the first attribute information to the image decompression unit;

the image decompression unit comprising:
a second table storing unit in which a second conversion table described based on the first conversion table is stored; and
a bit string inverse conversion unit which acquires the third bit string and the first attribute information, identifies a region to which the third bit string corresponds based on the first attribute information, and converts, for the region identified, the third bit string into a fourth bit string representing intensity of a pixel on a region-by-region basis using the second conversion table read from the second table storing unit.

5. An image compression unit according to claim 1, further comprising:
a bit plane conversion unit which converts the third bit string into a first bit plane; and
a bit plane compression unit which compresses the first bit plane and generates a first compressed data.

6. A tangible and non-transitory computer-readable recording medium that stores a program for allowing a computer to realize a function of an image compression unit according to claim 1.

7. An image processing system, comprising:
an image compression unit according to claim 1; and
an image decompression unit, wherein
the image compression unit outputs the third bit string and the first attribute information to the image decompression unit, and wherein
the image decompression unit comprises
a bit string inverse conversion unit which acquires the third bit string and the first attribute information, identifies a region to which the third bit string corresponds based on the first attribute information and converts, for the region identified, the third bit string into a fourth bit string representing intensity of a pixel on a region-by-region basis.

8. An image decompression unit, comprising;
a bit string inverse conversion unit which obtains a fourth bit string and a second attribute information corresponding to the fourth bit string, identifies a region to which the fourth bit string corresponds based on the second attribute information, and converts, for the region identified, the fourth bit string into a fifth bit string representing intensity of a pixel on a region-by-region basis.

9. An image decompression unit according to claim 8, further comprising;
a second table storing unit which stores a second conversion table, wherein
the bit string inverse conversion unit reads the second conversion table from the second table storing unit, and converts the fourth bit string into the fifth bit string using the second conversion table.

10. An image decompression unit according to claim 8, further comprising;
a bit plane decompression unit which acquires compressed data and performs decompression processing of the compressed data to obtain a bit plane; and
a data restoration unit which generates the fourth bit string from the bit plane obtained by the bit plane decompression unit.

11. A tangible and non-transitory computer-readable recording medium that stores a program for allowing a computer to realize a function of an image decompression unit according to claim 8.

12. An image compression method, comprising:
performing preprocessing for converting a first bit string representing intensity of each of a plurality of pixels of which image data is composed into a second bit string, a number of digits of which is smaller than a number of digits of the first bit string, based on a predetermined region included in the image data and on a first attribute information for identifying an attribute of the predetermined region, with the preprocessing being associated with the predetermined region of the image data; and
converting the second bit string into a third bit string based on distribution of a frequency of appearance of the intensity in the second bit string and the first attribute information such that, for the pixel having a higher frequency of appearance of the intensity, a number of bit planes on which data of the pixel appear is less.

13. An image compression method according to claim 12, further comprising:
storing a first conversion table, the first conversion table being configured by associating the second bit string and the third bit string which is assigned according to the frequency of appearance of the intensity of each of the pixel;
reading the first conversion table corresponding to an attribute of the region; and
converting the second bit string into the third bit string using the first conversion table which has been read.

14. An image processing method, comprising:
compressing an image by an image compression method according to claim 13;
outputting the third bit string and the first attribute information;
acquiring the third bit string and the first attribute information;
identifying a region to which the third bit string corresponds based on the first attribute information;
describing a second conversion table based on the first conversion table;
reading the second conversion table from the second table storing unit; and
converting, for the region identified, the third bit string into a fourth bit string representing intensity of a pixel using the second conversion table on a region-by-region basis.

15. An image compression method according to claim 12, further comprising:
converting the third bit string into a first bit plane; and
compressing the first bit plane to generate compressed data of the bit plane.

16. An image processing method, comprising:
compressing an image by an image compression method according to claim 12;
outputting the third bit string and the first attribute information;
acquiring the third bit string and the first attribute information;
identifying a region to which the third bit string corresponds based on the first attribute information; and
converting, for the region identified, the third bit string into a fourth bit string representing intensity of a pixel on a region-by-region basis.

17. An image decompression method, comprising:
acquiring a fourth bit string and a second attribute information corresponding to the fourth bit string;
identifying a region to which the fourth bit string corresponds based on the second attribute information; and
for the region identified, converting the fourth bit string into a fifth bit string representing intensity of a pixel on a region-by-region basis.

18. An image decompression method according to claim 17, further comprising:

reading the second conversion table from the second table storing unit; and converting the fourth bit string into the fifth bit string using the second conversion table.

19. An image compression unit, comprising:

a preprocessing means for performing preprocessing for converting a first bit string representing an intensity of each of a plurality of pixels of which image data is composed into a second bit string, a number of digits of which is smaller than a number of digits of the first bit string, based on a predetermined region included in the image data and a first attribute information for identifying an attribute of the predetermined region, with the preprocessing being associated with the predetermined region of the image data; and a bit string conversion means for converting the second bit string into a third bit string based on distribution of a frequency of appearance of the intensity in the second bit string and the first attribute information such that, for the pixel having a higher frequency of appearance of the intensity, a number of bit planes on which data of the pixel appear is less.

20. An image decompression unit, comprising;

a bit string inverse conversion means for obtaining a fourth bit string and a second attribute information corresponding to the fourth bit string, for identifying a region to which the fourth bit string corresponds based on the second attribute information, and for converting, for the region identified, the fourth bit string into a fifth bit string representing intensity of a pixel on a region-by-region basis.

* * * * *